(12) United States Patent
Eckert et al.

(10) Patent No.: US 10,188,205 B2
(45) Date of Patent: Jan. 29, 2019

(54) STRUCTURAL ELEMENT

(71) Applicant: Bulthaup GmbH & Co. KG, Bodenkirchen (DE)

(72) Inventors: Marc Oliver Eckert, Bodenkirchen (DE); Roger Paul Rieger, Landshut (DE); Ulrich Spohde, Bodenkirchen (DE)

(73) Assignee: Bulhaup GmbH & Co. KG, Bodenkirchen (DE)

( * ) Notice: Subject to any disclaimer, the term of this patent is extended or adjusted under 35 U.S.C. 154(b) by 25 days.

(21) Appl. No.: 15/302,194

(22) PCT Filed: Apr. 7, 2015

(86) PCT No.: PCT/EP2015/000731
§ 371 (c)(1),
(2) Date: Dec. 20, 2016

(87) PCT Pub. No.: WO2015/154867
PCT Pub. Date: Oct. 15, 2015

(65) Prior Publication Data
US 2017/0095074 A1    Apr. 6, 2017

(30) Foreign Application Priority Data

Apr. 7, 2014    (DE) .................. 10 2014 005 073

(51) Int. Cl.
*A47B 13/00*    (2006.01)
*A47B 91/00*    (2006.01)
(Continued)

(52) U.S. Cl.
CPC .............. *A47B 43/00* (2013.01); *A47B 3/002* (2013.01); *A47B 13/02* (2013.01); *A47B 33/00* (2013.01);
(Continued)

(58) Field of Classification Search
CPC ........... A47B 3/00; A47B 3/002; A47B 33/00; A47B 77/022; A47B 77/06; A47B 77/08;
(Continued)

(56) References Cited

U.S. PATENT DOCUMENTS 318,298 A  *  5/1885  Roberts
1,652,942 A  * 12/1927  James ..................... A47B 3/12
108/159
(Continued)

FOREIGN PATENT DOCUMENTS

EP    0 099 972 A1    2/1984
EP    2 359 713 A1    8/2011
(Continued)

*Primary Examiner* — Daniel J Troy
*Assistant Examiner* — Timothy M Ayres
(74) *Attorney, Agent, or Firm* — Dilworth & Barrese, LLP

(57) ABSTRACT

The present invention relates to a structural element, in particular a furniture element and particularly preferably a kitchen furniture element, having at least two frame elements and having at least one connection part by which the frame elements are connected, wherein the frame elements span a space whose shape depends on the angle between the frame elements.

18 Claims, 40 Drawing Sheets

(51) Int. Cl.
| | |
|---|---|
| *A47B 43/00* | (2006.01) |
| *A47B 3/00* | (2006.01) |
| *A47B 13/02* | (2006.01) |
| *A47B 77/06* | (2006.01) |
| *A47B 77/08* | (2006.01) |
| *A47B 77/16* | (2006.01) |
| *A47B 77/18* | (2006.01) |
| *A47C 4/08* | (2006.01) |
| *A47C 7/00* | (2006.01) |
| *A47B 33/00* | (2006.01) |
| *A47B 77/02* | (2006.01) |
| *A47B 95/00* | (2006.01) |
| *A47C 4/00* | (2006.01) |
| *A47K 3/28* | (2006.01) |
| *B60B 33/00* | (2006.01) |
| *E04H 1/12* | (2006.01) |
| *F16C 11/04* | (2006.01) |

(52) U.S. Cl.
CPC ............ *A47B 77/022* (2013.01); *A47B 77/06* (2013.01); *A47B 77/08* (2013.01); *A47B 77/16* (2013.01); *A47B 77/18* (2013.01); *A47B 95/00* (2013.01); *A47B 95/008* (2013.01); *A47C 4/00* (2013.01); *A47C 4/08* (2013.01); *A47C 7/002* (2013.01); *A47C 7/006* (2013.01); *A47K 3/284* (2013.01); *B60B 33/00* (2013.01); *E04H 1/1266* (2013.01); *F16C 11/04* (2013.01); *A47B 2003/006* (2013.01); *A47B 2200/0018* (2013.01)

(58) Field of Classification Search
CPC ......... A47B 77/16; A47B 77/18; A47B 95/00; A47B 95/008; A47B 2003/006; A47B 2005/003; A47B 11/00; A47C 4/00; A47C 7/002; A47C 7/006; A47K 3/284; B60B 33/00; E04H 1/1266; F16C 11/04
USPC ................................................. 108/153.1, 90
See application file for complete search history.

(56) References Cited

U.S. PATENT DOCUMENTS

| | | | | |
|---|---|---|---|---|
| 1,963,594 | A * | 6/1934 | Schwabe ................ | A47B 31/04 108/159 |
| 1,979,843 | A * | 11/1934 | Roos ....................... | A47B 3/12 108/115 |
| 2,469,232 | A * | 5/1949 | Kennedy .................. | A47B 3/12 108/162 |
| 2,540,254 | A * | 2/1951 | Garber ..................... | A47B 3/12 108/158 |
| 2,669,117 | A * | 2/1954 | Fuhrmann ............... | E04G 21/00 108/101 |
| 2,883,248 | A * | 4/1959 | Hoppe ..................... | A47B 1/03 108/117 |
| 3,657,746 | A * | 4/1972 | Downey ................. | A47K 3/325 4/599 |
| 3,817,191 | A * | 6/1974 | Hansen ................... | A47B 3/002 108/79 |
| 3,925,828 | A * | 12/1975 | Kim ........................ | A47K 3/325 135/157 |
| 4,541,597 | A * | 9/1985 | Davanture ............... | A47B 3/12 248/167 |
| 6,863,341 | B1 * | 3/2005 | Wen ........................ | A47C 1/124 297/23 |
| 7,415,933 | B2 * | 8/2008 | Sagol ....................... | A47B 3/02 108/115 |
| 7,520,228 | B2 * | 4/2009 | Mangano ............... | A47B 3/002 108/115 |
| 7,695,079 | B2 * | 4/2010 | Cheng ..................... | G06F 1/181 312/223.2 |
| 8,100,275 | B2 * | 1/2012 | Trowsdale ............. | D06F 57/08 211/195 |
| 8,677,534 | B2 * | 3/2014 | Gant ....................... | A47D 5/00 5/655 |
| 8,789,477 | B2 * | 7/2014 | Jimenez Mangas ..... | A47B 1/03 108/115 |

FOREIGN PATENT DOCUMENTS

| | | |
|---|---|---|
| WO | 81/01321 A1 | 5/1981 |
| WO | 2013/157968 A1 | 10/2013 |
| WO | 2015/055263 A1 | 4/2015 |

* cited by examiner

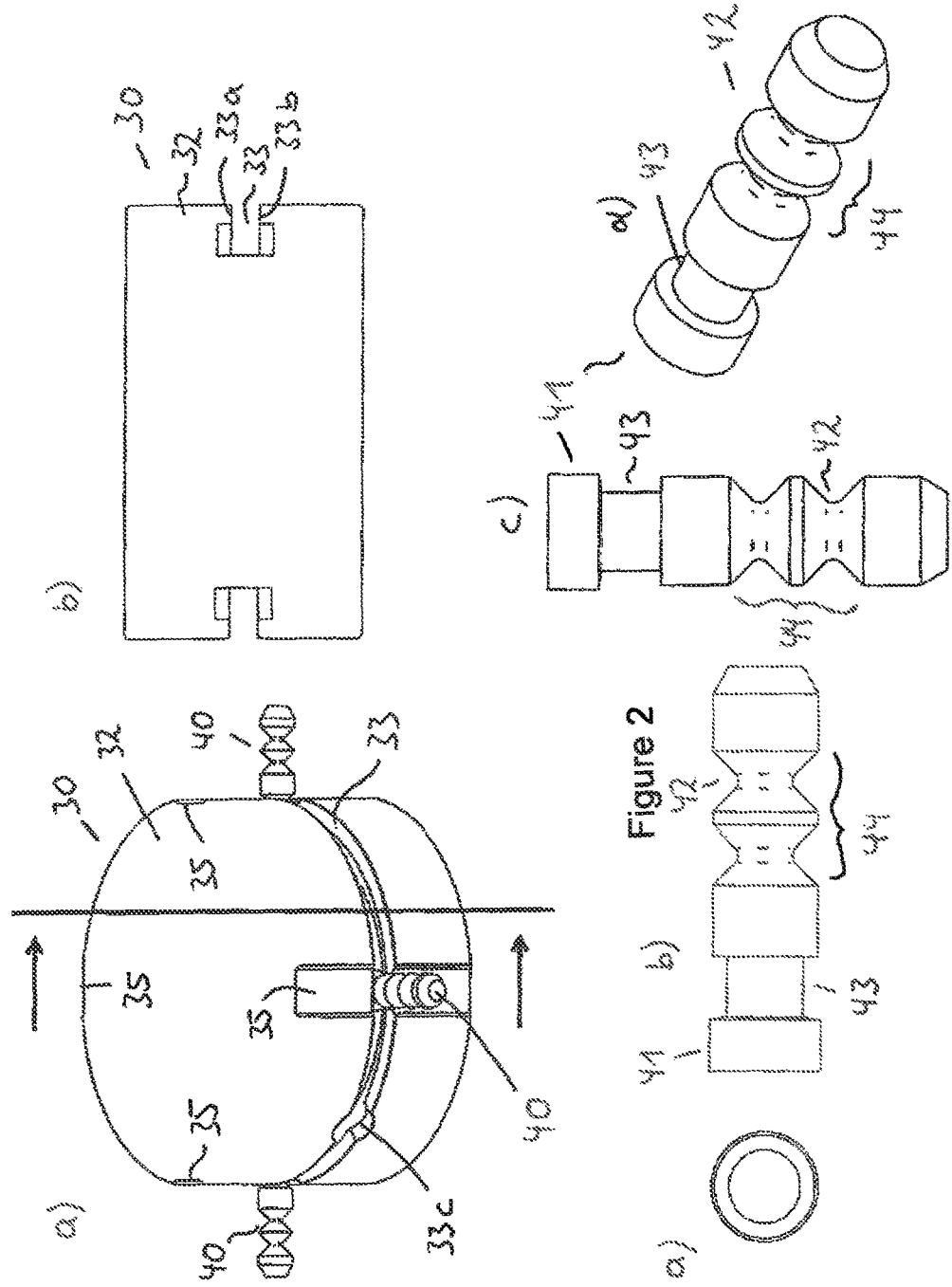
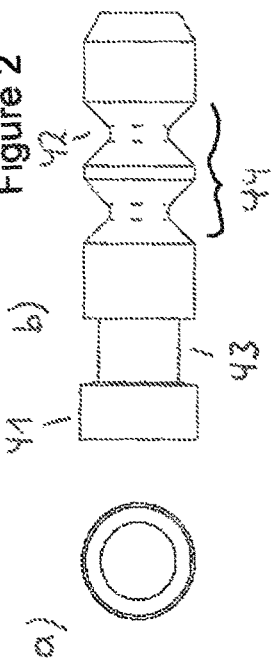
Figure 1
Figure 2

STRUCTURAL ELEMENT

BACKGROUND OF THE INVENTION

The present invention relates to a structural element, in particular to a furniture element, and particularly preferably to a kitchen furniture element. Furniture elements for kitchens are known in numerous different embodiments, for example as floor units, wall units or also as tall units. They typically comprise a carcass which is closable by a door or flap or in which a plurality of drawers are received.

There is a disadvantage in the majority of known furniture elements for kitchens in that they have fixedly predefined dimensions and can therefore not be adapted, or can only be adapted with difficulty, to different spatial circumstances.

SUMMARY OF THE INVENTION

It is therefore the underlying object of the present invention to further develop a structural element, in particular for use as a furniture element and preferably for a kitchen, such that it allows a particularly flexible use.

This object is achieved by a structural element having the features herein. Provision is accordingly made that the structural element has at least two frame elements as well as at least one connection part by which the frame elements are connected, with the frame elements spanning a space whose shape depends on the angle between the frame elements.

Structural elements can be provided in different shapes and sizes due to the shape and length of the connection part and/or of the frame elements as well as by the angle the two frame elements include between them.

The angle can be fixed, i.e. not variable, or can also be variable on an embodiment of the connection part as a hinge.

The connection parts can be connected to the frame elements such that they are not adjustable relative to the connection parts. Provision is made alternatively to this that the connection part is configured as a hinge, which means that the frame elements can positioned at different angles relative to one another.

The term "hinge" within the framework of the present invention generally means a connection part by means of which the frame elements can be fixed in different positions so that different angles can be set between the frame elements.

The connection parts and the frame elements can be fixedly (non-releasably) or releasably connected to one another.

The connection parts and the frame elements can be configured as single-part elements, i.e. can comprise one and the same part, or can also be formed from a plurality of parts (connection part, on the one hand, frame element, on the other hand) which are connected to one another by suitable connection means. It is e.g. conceivable in the latter case that the frame elements are released from the connection part and are replaced with frame elements having different dimensions, colors, etc.

It is conceivable that the structural element is designed with at least two frame elements as well as with at least one hinge as a connection part by means of which the frame elements are pivotable with respect to one another or are positionable at different angles relative to one another.

At least one connection means can furthermore be provided which has at least one first section, which is connected to the connection part or hinge and which is movable relative to the connection part or the hinge in at least one operating state, and which has at least one second section which is connected to the frame element.

The or connection means is preferably rotatable relative to the base body of the hinge, i.e. is movable in the peripheral direction of the base body. This can be achieved, for example, in that at least one groove is arranged in the base body in which the at least one connection means runs. It is also conceivable that the one or more connection means are arranged at a peripheral element such as a ring or the like which is rotatable relative to the base body. An alignment of the connection means relative to the base body is also conceivable in this manner.

It is, for example, conceivable by the present invention that the two frame elements are at an angle of 90° to one another or are also pivoted with respect to each other such that acute and obtuse angles are present between them. It is also conceivable to fold the structural element together such that it is as space-saving as possible in that the frame elements contact one another largely or completely, which can be meaningful, for example, as part of transport or storage.

It is possible by the hinge or joint in accordance with the invention to displace the frame element or elements along the groove or the like, preferably along the periphery of the base body, and to fix it or them at the desired position. The angle between two frame elements can thus, for example, be adjusted to 90° or also to a smaller or larger angle. If the structural element should be folded together, it is conceivable to reduce the angle such that the frame elements contact one another or have a comparatively small spacing from one another. It is conceivable by the provision of a groove that the frame elements can be fixed in any desired positions and not only in specific positions in the groove so that any desired angles can accordingly also be set between the frame elements.

However, the case is also covered by the invention that the hinge has preferred positions in which the frame elements can be fixed relative to the hinge.

A preferred embodiment of the invention comprises the frame elements not being movable relative to the connection part, i.e. either fixedly connected thereto as is e.g. the case with an embodiment in one piece, or being able to be installed only at exactly one position at the connection part so that the angle between the frame elements is fixedly predefined.

The groove is preferably designed as peripheral, but can also only be partially present, i.e. does not extend all about the base body.

The groove preferably has at least one opening through which the connection means can be introduced into the groove. The opening is dimensioned such that the first section of the connection means can be introduced through this opening into the groove. If the connection means in the groove is moved away from the opening, it is held by the groove in a shape-matched manner in the radial direction of the hinge, but is movable along the groove prior to the installation of the frame element.

The present invention furthermore relates to a structural element having the features herein.

This structural element, in particular a furniture element and particularly preferably a kitchen furniture element, has at least one frame which has at least two limbs extending from top to bottom and preferably vertically, with one or more struts extending between these limbs whose upper side is inclined relative to the horizontal or whose upper side extends horizontally. These struts preferably extend along one or more outer sides of the structural element, with provision preferably being made that the surface is remote from the outer side, i.e. faces toward or is inclined toward the interior of the structural element. The term "strut" is to be understood generally and comprises any desired element which extends between the vertical limbs. The struts can be formed as plates, profiles, runners, rods, etc.

The struts serve as a support for any desired functional elements such as drawers, shelves or any other desired storage shelves. In a preferred embodiment of the invention, the functional elements have counter-surfaces which lies on the struts and which preferably extends in parallel with the surface of the struts.

In this respect, provision is made in a preferred embodiment of the invention that the structural element has at least two frame elements as well as at least one hinge by means of which the frame elements can be positioned at different angles relative to one another or that the structural element has at least two frame elements as well as at least one connection part by means of which the frame elements are connected fixedly and cannot be positioned at different angles with respect to one another.

The frame elements span a space whose shape depends on the angle between the frame elements.

The structural element in accordance with claim 5 can be configured with further features, i.e., have at least one connection part or hinge.

The strut can be fixedly arranged at the limbs or such that the strut is displaceable along the limbs or can be otherwise positioned at a plurality of different positions of the limbs. It is, for example, conceivable that the limbs have a groove which extends in the longitudinal direction of the limbs and that the strut(s) has/have a projection which runs in the groove.

It is conceivable that the structural element has a first side and a preferably oppositely disposed second side such as a right outer side and a left outer side and that at least one respective strut is located both on the first side and on the second side, with the struts being aligned such that their upper sides inclined relative to the horizontal face toward the inner side of the structural element. In a view from the front, the structural element can thus, for example, have a respective one or more struts at its right side and at its left side which face one another such that the perpendicular lines respectively extending from surfaces of the struts arranged at the right and left each intersect. These statements do not apply to the sides at the right and left, but rather to any desired sides of the structural element such as the front and rear, etc.

The struts can generally also be arranged such that their surface lies in the horizontal.

The upper side of the struts is preferably inclined by an angle in the range of 30° to 60° and preferably by an angle of 45°, for example, relative to the horizontal.

Provision can furthermore be made that the limbs between which the strut extends include a predefined angle with respect to one another in a cross-sectional view, at least in the region at which the strut is arranged, with provision preferably being made that this angle is constant independently of the angle the frame elements include with respect to one another, and is preferably at 90°. Each of these regions which the strut contacts can thus be angled by an angle of 45° relative to a center plane of the structural element so that two of these regions include an angle of 90° with one another.

The above angle indications are only exemplary values which do not restrict the invention.

Provision is preferably made that the limbs have grooves in which the struts are displaceably received.

The limbs preferably form the outer edges of the structural element. The groove is preferably arranged at a side of the limbs remote from the outer side.

Provision can furthermore be made that guide elements are provided by means of which a functional element such as in particular a drawer or a tray or the like, which lies on the limbs, can be pulled out and pushed in, with the guide elements being arranged at the limbs and/or at the functional element. These guide elements can be configured as drawer runners, roller bearings, etc. The case is naturally also covered by the invention that the functional elements slide along on the surface of the limb when the functional elements are pulled out or pushed in.

Provision is preferably made that the second section of said connection means is received in a bore or in another mount of the end region of the frame element which is adjacent to the connection part or hinge. A mount or the like in which the connection means is located can thus, for example, be provided in the end face of the frame element with which it is adjacent to the connection part or hinge. The connection means is preferably releasably arranged in the mount when the frame element is not yet fixedly connected to the connection part or hinge.

Provision can furthermore be made that a fixing element is provided which cooperates with the connection means such that the frame element is fixed relative to the connection part or hinge when the fixing element is located in its fixing position. It is thus possible by a corresponding actuation of the fixing element to hold the frame element in the desired position and preferably to fix it relative to the connection part or hinge. If it should be released from this fixed position, provision can be made to release the fixing element again, which has the consequence that the frame element is again movable relative to the connection part or hinge or that the connection means can again be moved along the groove or relative to the base body of the hinge.

Provision is preferably made that the fixing element cooperates with a section of the connection means which has at least one slope relative to the longitudinal axis of the connection means, with this slope being aligned such that a movement of the frame element toward the connection part or hinge takes place during said cooperation. In this case, the frame element is drawn toward the connection part or hinge, preferably up to the end face of the frame element at the connection part or hinge, in that the fixing element is brought into its fixing position. This can take place, for example, in that the fixing element is formed by a screw and the screw is tightened.

The screw can be screwed into a bore or threaded bore or another mount of the frame element so that the end region of the screw comes into contact with the connection means. If the end region of the screw or another section of the screw comes into contact with the connection means and preferably with said slope, the fixing element together with the frame element is pulled toward the connection part or hinge and is fixed by force transmission and/or by shape matching at the connection part or hinge.

The number of frame elements which are connected to one another by means of the connection part or hinge element is largely as desired. It is conceivable that three, four, six or eight end regions of frame elements are connected to the connection part or hinge. This list is exemplary and does not restrict the invention.

Provision is made in a further embodiment of the invention that the base body of the connection part or hinge has at least one recess or at least one projection which is in shape-matched connection with the end region of the frame element. It is ensured in this manner that a connection between the frame element and the connection part or hinge is established which is particularly loadable. In this respect, the connection part or hinge can, for example, have a recess into which a projection or the frame element or its end region as such engages or, conversely, the connection part or hinge can have a projection which is connected to or contacts a recess of the frame element.

It is furthermore conceivable that the structural element has horizontal and vertical limbs, with the horizontal limbs being displaceably guided relative to the vertical limbs or being able to be arranged at different positions of the vertical limbs. It is possible in this manner to adjust the height of the upper side of the structural element such as a working region, a hob etc.

The structural element in accordance with the invention can have exactly two or also more than two frame elements.

Due to the fact that different angles can be set between the frame elements in an embodiment, the external dimensions of the structural element can accordingly also be easily changed. If the two frame elements are of the same size and if they are at angle of 90° with respect to one another, a structural element which is square in cross-section results in a plan view. If the angle is changed, a structural element which is rectangular in cross-section results in a plan view. It is thus possible in a simple manner to provide differently dimensioned structural elements by setting the angle between the frame elements without a construction change of the structural element being required for this purpose.

The same also applies accordingly to the case that the frame elements are not adjustable relative to the connection part. In this case, a variation can be achieved by the replacement of the connection part and/or of the frame element or elements.

In a preferred embodiment of the invention, the structural element is of a modular configuration and is expandable, for example in that a plurality of structural elements are combined or grouped into a system, in particular into a furniture system. It is thus conceivable, for example, that a plurality of structural elements are arranged next to one another and/or above one another.

The structural elements in accordance with the present invention can be implemented in any desired sizes. It is thus conceivable to design the structural elements for floor units, for example, at a height typical for floor units and to design the structural elements correspondingly high for tall units, for example.

It is conceivable in a preferred embodiment of the invention that the frame elements are peripheral or that the frame elements are open at one or more sides, i.e. are not peripheral. The term "frame element" is thus by no means to be understood restrictively such that only peripheral frames such as picture frames are covered by it although such an embodiment is also covered by the invention.

The term "frame element" covers any desired element which is directly or indirectly connected to the at least one connection part or hinge.

The frame element can—as stated—be peripheral, with the peripheral structure being able to be closed or also being able to have an interruption. The frame element can also have the form of a lying or standing U, V or L, etc. The frame element can be straight or also curved. At least one limb of the frame, in the case of a U-shaped or V-shaped frame preferably both end regions of the U or V, is preferably connected directly or indirectly to the connection part(s) or hinge(s).

It is thus conceivable, for example, that, for example, two or also more than two frame elements are provided which each have a peripheral frame or shape or one of any desired other configuration or have one or more open sides. It is thus conceivable, for example, that the frame elements are open to the bottom or to the side and thus have the shape of a U, V, L, etc. which is standing, upside down or lying.

Provision is made in a conceivable embodiment of the invention that the frame elements are peripheral, i.e. are in the form of a closed frame.

Said frame elements, which are connected to one another via the at least one connection part or hinge or at arranged thereat, can be in one part or multiple parts. Each frame element can thus comprise exactly one part or also a plurality of parts.

They can be connected to one another by means of a connection part or hinge or preferably by means of two connection parts or hinges and can optionally be pivotable relative to one another, with, in the case of two connection parts or hinges, them preferably being spaced apart in the vertical direction and/or in the horizontal direction. This applies both to standing and to lying structural elements.

Provision is made in a further embodiment of the invention that the connection part or hinge or the connection parts or hinges are arranged such that it/they lie(s) in the point of intersection of the planes formed by the two or more than two frame elements present.

It is furthermore conceivable that at least one frame element and preferably all the frame elements do not end at the connection part or hinge, but rather extend beyond it. The connection part or hinge can in this respect, for example, be arranged in a central region of the frame element.

The case is, however, also covered by the invention that the frame elements end at the connection part or hinge and extend, for example, substantially in star shape or radially from the at least one connection part or hinge.

Provision is made in a further embodiment of the invention that the at least one connection part or hinge is located in a central region of the frame element(s) and/or of the structural element. The frame element or elements preferably has/have at least one horizontal limb, with the at least one connection part or hinge being arranged centrally in the horizontal limb or with the at least one connection part or hinge being arranged such that the horizontal limbs of the frame elements end at the connection part or hinge.

It is conceivable that the frame elements have at least one horizontal limb and preferably two horizontal limbs as well as at least one vertical limb and preferably two vertical limbs which extend(s) between the horizontal limbs. A preferred embodiment of the invention thus comprises the frame elements having the shape of a rectangle or of a square or of a U whose inner region is hollow.

The features named with respect to the horizontal and/or vertical limbs apply accordingly to limbs inclined relative to the horizontal and/or inclined relative to the perpendicular.

Provision is made in a further embodiment of the invention that a respective frame element lies in over plane overall.

Provision is alternatively made that at least one section of the frame element is present which lies in a different plane than the remaining part of the frame element. It is thus conceivable that, for example, the vertical limb or limbs of the frame element or elements is/are angled and thus do/does not lie in the plane in which the remaining frame element is arranged. The background to this angled arrangement comprises a compensation for the different angles which the frame elements can include with one another being provided in this manner.

If the region between the ends of two frame elements should e.g. be closed by a door, hinges must be directly or indirectly arranged at the frame elements. If the hinges were arranged directly at the frame elements respectively lying in a plane, an orientation would result in dependence on the angle between the frame elements which is dependent on said angle and which could have the result, for example, that the door fixed to the hinge projects from the frame element at an angle of 90° in its closed position and does not extend to the adjacent frame element in the closed position, which would be desirable per se.

The same applies accordingly to the fastening means of drawers, trays, etc.

To keep the alignment of the door hinges, etc. the same even with different angles between the frame elements, provision can thus be made to angle the section of the frame elements at which the door hinges etc. are arranged.

Provision is made in a further embodiment of the invention that at least one adapter is provided, in particular for fixing a hinge for a door or flap or for fixing a drawer runner or for fixing a wheel, and is fixed to the frame element by means of one or more fixing means.

This adapter preferably serves the setting of the correct angle, for example for the installation of a hinge for a door or flap.

This adapter can, for example, be fixed to the frame element by shape matching.

It is conceivable in this respect that the frame element preferably has at least one groove as a fixing means in which at least one projection of the adapter is received in shape-matched manner, with provision preferably being made that the groove is configured in the form of a dovetail in cross-section and the adapter has a dove-tailed projection which is received in the groove of the frame element. The reverse application is naturally also conceivable, namely that the named groove is located in the adapter and the projection in the frame element.

Provision is made in a further embodiment of the invention that the frame element spans a plane and that an angled part of the frame element is arranged in a plane extending at an angle thereto, with the adapter or the named strut being arranged, for example, at this angled part of the frame element. As already stated above, the adapter serves, for example, the fixing of a hinge or a drawer runner and the angled part of the frame element serves to ensure that the door or flap or the drawer is correctly aligned.

Provision is preferably accordingly made that the angle of said angled frame element is configured in dependence on the angle the two frame elements include with one another.

In a further embodiment of the invention, at least one element, in particular at least one metal element, in particular at least one metal insert, is provided which extends between the angled region of the frame element and the adjacent region of the frame element and which fixes the angle by which the angled part of the frame element is angled with respect to the plane spanned by the frame element. The angle by which the angled part of the frame element projects from the plane formed by the frame element can thus be set exactly by the metal element which is likewise angled.

Provision can furthermore be made that the frame elements have at least one horizontal limb, preferably two horizontal limbs, as well as at least one vertical limb, preferably two vertical limbs, which extend between the horizontal limbs, with the fixing means for the adapter(s) being located at the horizontal limb(s) and/or at the vertical limb(s).

Alternatively or additionally to this, it is conceivable that the fixing means are located at the frame elements at both sides or only at one side.

Provision is made in a further conceivable embodiment of the invention that the limbs or struts extending from the top to the bottom do not extent vertically, but are rather inclined relative to the vertical. The transversely extending limbs or struts also do not have to extend in the horizontal, but can rather also be inclined relative to it. It is thus conceivable, for example, that the perpendicular struts or limbs can project further in the upper connection part or joint or hinge in a further variant than in the lower connection part or joint or hinge, or vice versa. An inclined frontal situation thus arises. It is necessary for this purpose that the intermediate adapter or the above-named angled part of the frame element has to be cropped both in the x direction and in the y direction in the corner region and when not equal to 90°.

Provision is made in a further embodiment of the invention that at least one flap or door is provided by means of which at least one side of the structural element is closable. It is also conceivable that one or more drawers and/or containers and/or storage shelves are located in the space spanned by the frame elements.

Provision is made in a further embodiment of the invention that at least one of the frame elements, preferably all of the frame elements, comprise a flat material, i.e. a material whose thickness is smaller than its height and width. Runner-shaped elements of plastic or wood can be considered, for example.

The structural element can have one or more adjustment feet, preferably vertically adjustable adjustment feet and/or rollers.

Provision is made in a further embodiment of the invention that at least one holding means, in particular for holding a storage container such as a trash can, is located at the frame element(s) and/or at the hinge.

Provision can furthermore be made that the structural element is covered by a plate at its upper side and/or that at least one illumination unit or at least one extractor hood element extends from the structural element. It can be in the form of a "gallows" so that it extends upward from the structural element and then beyond the structural element.

The connection part does not have a lengthways extent in a conceivable embodiment, but is rather designed as a compact body. The connection part can, however, also be configured as an elongate component at whose ends a respective one or more frame elements are arranged. It is thus possible to vary the spacing of the frame elements by connection parts of different lengths and thus to provide structural elements of different dimensions.

The connection part can be designed as a round, angled, X-shaped or Y-shaped part in plan view.

It is advantageous if one or more of the frame elements have one or more grooves on their sides remote from the spanned space in which grooves projections of one or more functional elements are arranged which are located in the space spanned by the frame elements. They can, for example, be storage shelves, insertable shelves, grates, etc.

The converse case is also conceivable that the frame elements have one or more projections at their sides facing the spanned space, which projections are received in one or more grooves of the functional element(s).

Provision can be made in this respect that no further holding means are provided for the functional elements so that they are only fixed via the grooves and projections.

Provision can generally be made that the projections are displaceable in the grooves so that a vertical adjustability is given.

The present invention furthermore relates to a modular system comprising structural elements, in particular furniture elements in accordance with one of the preceding claims. Adapters can furthermore be provided for installation at the frame element(s), with the adapters being of identical design for all structural elements. In this embodiment of the invention, the adapters are thus made as non-variable parts which are identical independently of the angle in which the frame elements are with respect to one another. The angular compensation is effected by the angled part of the frame elements as has been described in more detail above.

The invention furthermore relates to a system, in particular to a furniture system, having at least two structural elements.

The at least two structural elements can be arranged directly next to one another or directly above one another or can be spaced apart from one another. It is conceivable that one or more functional elements such as at least one work surface, sink, shelf or a drawer or a storage space are located in the region between and/or on the structural elements. The functional element(s) can extend in the spacing between and/or on two structural elements or also between and/or on two structural elements arranged directly next to one another.

The functional element can be at least one shelf, with the at least two structural elements each having at least one axle or shaft and with the shelf having at least one element which extends peripherally about the at least two axles/shafts of the at least two structural element and at which one or more shelf elements or other storage elements are arranged. The axles/shafts are preferably arranged in alignment with the hinge(s) of the frame elements. They extend in a preferred embodiment between the mutually spaced apart points of intersection of the frame elements and particularly preferably between the two mutually spaced apart connection parts or hinges which fixedly or pivotably connect the frame elements to one another.

Drive means can be provided which are configured such that they effect a movement of the peripheral element about the axles/shafts. The drive means can be formed, for example, by a motor or also by drive means to be operated by hand such as by a crank or the like.
1. A "folding solution" for transport;
2. the reception of rotationally symmetrical bodies (e.g. trash containers); and
3. a "luggage strap" solution, i.e. a solution with a strap running around on a simultaneous use of two or more structural elements, is, for example, made possible by the axle or shaft which is preferably arranged at the center of the structural element and connects the structural element at the center.

The axle or shaft preferably connects two sides (top/bottom or right/left or front/back) of the structural element.

The present invention furthermore relates to a table having at least one structural element, wherein the table has at least one table top which lies directly or indirectly on the structural element(s). The upper sides of the frame elements can thus form the support element for at least one table top, with one or more spacers being able to extend between the upper side and the table top.

The present invention furthermore relates to a chair or stool having at least one structural element, wherein the chair or stool has at least one seating element which forms the seating surface and which lies directly or indirectly on the structural element. The structural element can thus also serve as a base element for a chair or stool.

It is conceivable that at least one backrest and/or at least one element rotatable relative to the structural element, in particular a turntable, is provided, wherein the rotatable element is arranged such that the structural element is rotatable relative to its surface on which it stands and/or such that the seating element and/or the backrest is/are rotatable relative to the structural element. A swivel chair or a chair having a rotatable seating surface can be readily formed in this manner.

The present invention furthermore relates to a walkable element, in particular to a shower cubicle or a changing cubicle, having at least one open side through which the element is walkable, wherein the walkable element has at least one structural element in, and wherein the open side extends between at least two limbs of the frame element(s). The space reachable through the entrance can be formed by the space spanned by the frame elements.

The structural element can thus, for example, also be used in a wet room such as in a bathroom. In this respect, at least one side of the structural element forms the entrance or exit. It preferably extends between two vertical limbs of the frame element(s).

The structural element is preferably used as a furniture element, i.e. as a part and in particular as a basic frame of a furniture element.

The present invention furthermore relates to a hinge, in particular for use for a structural element, preferably for a furniture element and particularly preferably for a kitchen furniture element in accordance with the invention, wherein the hinge has at least one base body and at least one connection means which has at least one first section which is movable relative to the base body of the hinge and which has at least one second section which is connected to the frame element(s) of the structural element. The present invention is thus not only directed to a structural element as such, but rather also to a hinge which is preferably used in a structural element in accordance with the invention or in an element such as a table, chair or the like which has at least one structural element in accordance with the invention.

The hinge is preferably formed with one or more of the features described in more detail above.

BRIEF DESCRIPTION OF THE DRAWINGS

Further details and advantages of the invention will be explained in more detail with reference to an embodiment shown in the drawing. There are shown:

FIG. 1: a perspective view and a side view of the hinge;

FIG. 2: different views of the connection means;

DESCRIPTION OF THE PREFERRED EMBODIMENTS

Figure 3:
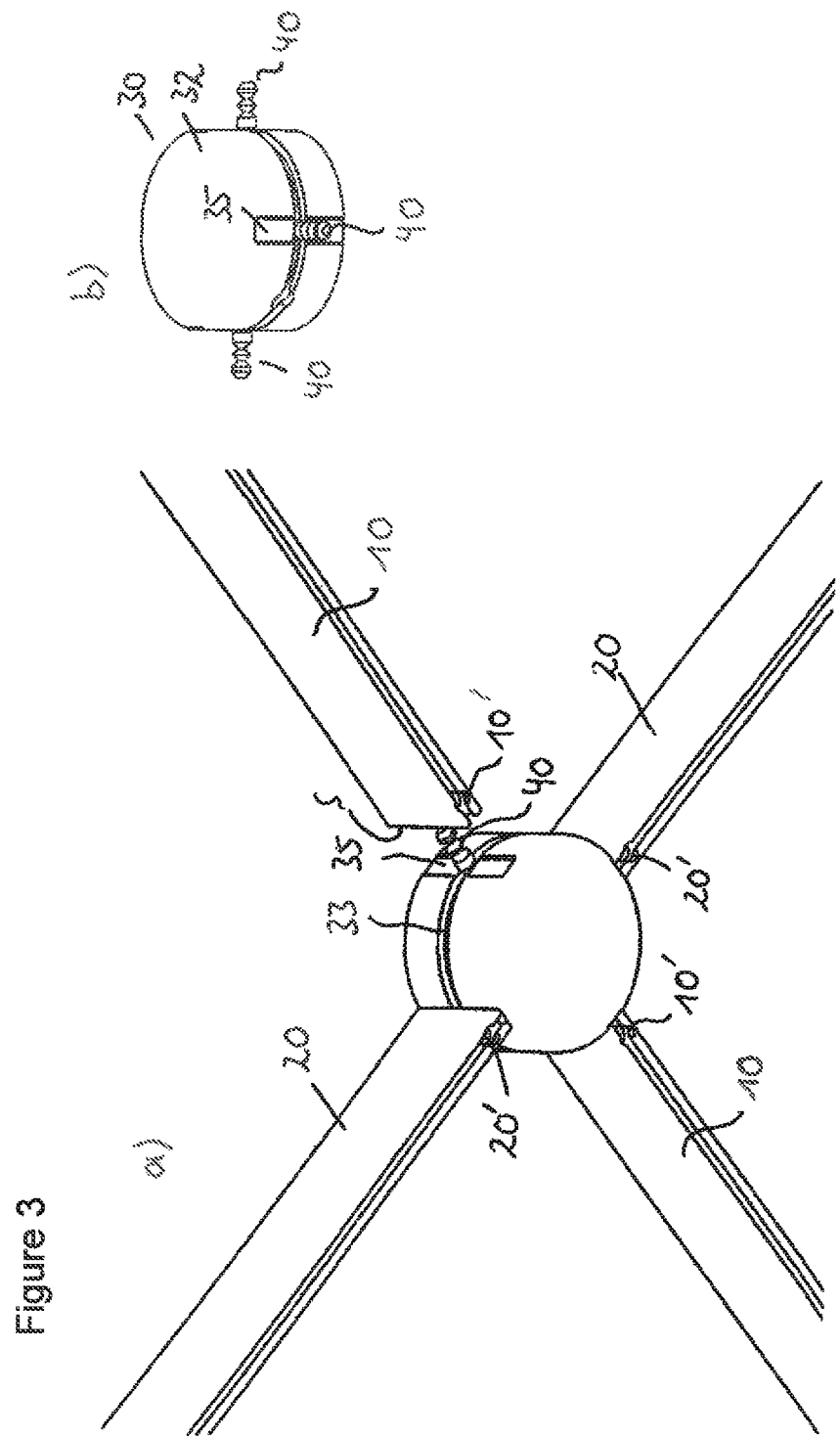
FIG. 3: a perspective view of the hinge as well as of sections of the frame elements before and after installation at the hinge as well as a perspective view of the hinge with a plurality of connection means arranged thereat.

A preferred embodiment of a hinge 30 in accordance with the invention can be seen from FIGS. 1a) and b). The hinge 30 comprises a base body 32 which has a groove 33, preferably a peripheral groove, at its outer periphery. As can be seen from FIG. 1b), the groove is of T shape in cross-section or has an otherwise configured undercut. FIG. 1b) shows a sectional view through the base body 32 in accordance with the line in FIG. 1a).

A plurality of recesses 35 are located at the base body 32 which are distributed in the peripheral direction and which serve the reception of the end faces of the frame elements.

A plurality of connection elements 40, whose shape can be seen from FIG. 2, run in the groove 33. The connection elements 40 have a first section 41 which is received in the groove 33 as well as a second section 42 which is connected to the end regions of the frame elements which are movable relative to one another by means of the hinge 30. The section 43 is located between the two groove walls 33a and 33b behind which the undercut is located.

The second section 42 is received in a bore or other mount of the frame elements such that is longitudinally displaceable in the bore or mount as long as the frame elements are not fixed relative to the hinge 30. As can be seen from FIG. 2, the second section has regions 44 which extend obliquely, i.e. not in parallel with the longitudinal axis of the connection element 40.

As can further be seen from FIG. 1a), the groove 33 has at least one extended region 33c which is dimensioned such that the connection elements 40 can be introduced into the groove through it. If the connection elements are then moved away from the region 33c) in the groove, they are fixed in the groove by shape matching.

FIG. 2b) shows the connection element 40 in a side view; FIG. 2c) in a plan view; FIG. 2d) in a perspective view; and FIG. 2a) in a view from the front which results on a view of the connection element in FIG. 2b) from the right.

A perspective view of the hinge having a plurality of connection elements received therein can likewise be recognized from FIG. 3b).

FIG. 3a) shows the hinge in a perspective view with the ends of the frame elements 10, 20 arranged or to be arranged thereat. As can be seen from FIG. 3a), the frame elements 10, 20 are placed onto the connection elements 40 such that the connection elements 40 are arranged in a bore or other mount of the frame elements 10, 20 at the end face. Depending on the position of the groove 33 in which the frame elements 10, 20 are fixed, a specific angle results between them and a specific shape with respect to the total structural element.

The frame elements 10, 20 are plugged onto the connection element 40 or the connection elements 40 already introduced into the frame elements 10, 20 are introduced into the groove for the installation.

A screwing of a screw into the threaded bore 10' or 20' of the frame elements 10, 20 arranged at the bottom subsequently takes place. The screw comes into contact with the chamfered region 44 of the connection elements 41, and indeed such that the screw, and with it also the frame element 10, 20, are pulled to the base body 32 of the hinge. This movement takes place for so long until the end face S of the frame element 10, 20 is arranged in the groove-like reception region 35 of the base body. In this state, a stable connection results between the hinge 30 and the frame elements 10, 20 so that a movement of the frame elements 10, 20 relative to the hinge and in the groove is precluded. The angle of the frame elements with respect to one another is thus fixed.

If it is to be changed, the screws or other fixing means have to be released so that the frame elements can be moved out of the reception region 35 and can then be displaced along the groove 33.

Figure 4:
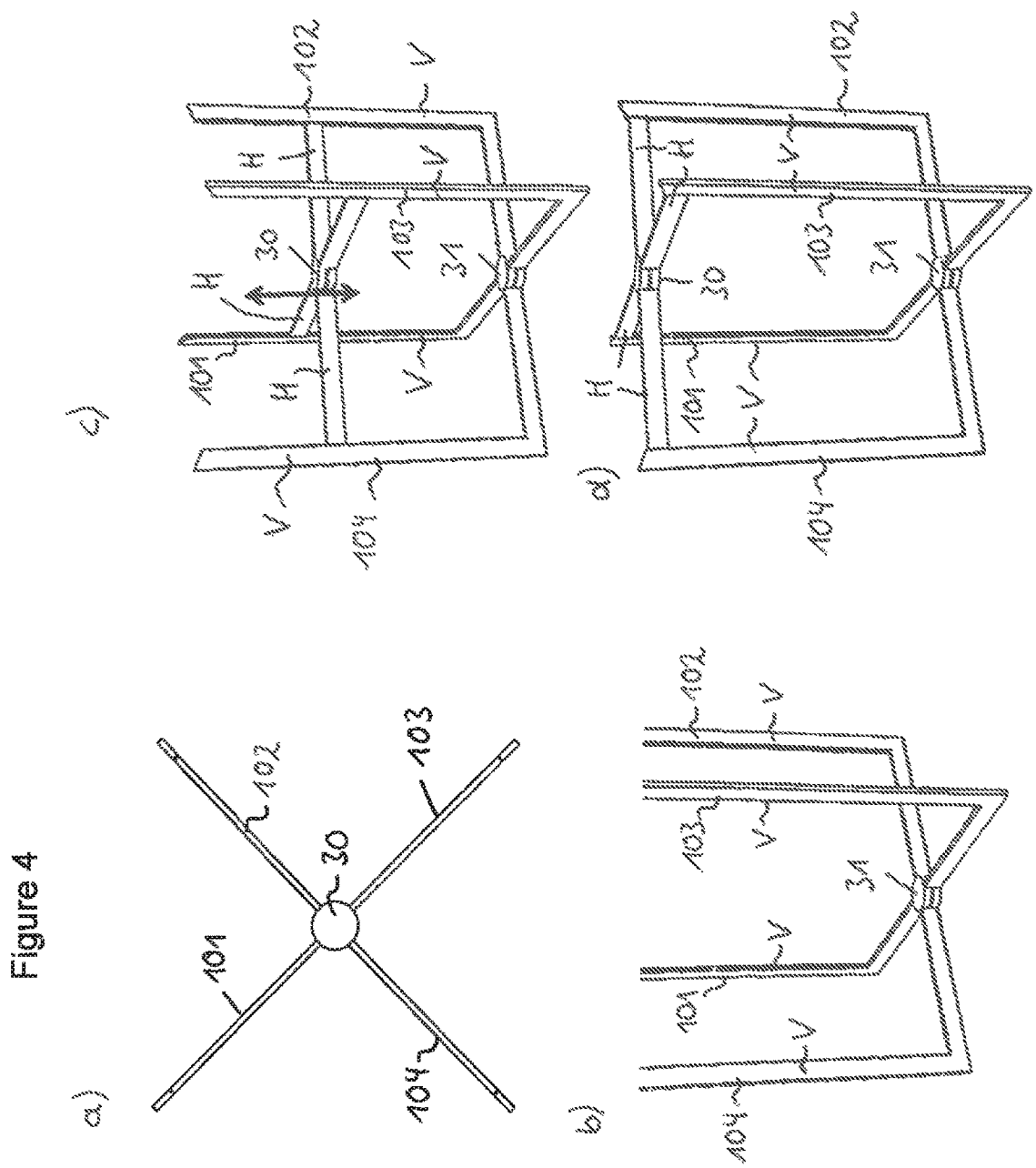
FIG. 4: perspective views of the structural element with the hinge in accordance with the invention.

FIG. 4 shows different views of a structural element in accordance with the invention. In this respect, a plan view can be seen from FIG. 4*a*) and a perspective view from FIG. 4*b*). Four frame elements 101, 102, 103, 104 are adjacent to the hinges 30, 31, with the upper horizontal limbs H not being fixedly connected to the vertical limbs V, but rather being arranged displaceable relative to them. For this purpose, the limbs V have grooves in which the limbs H run by means of projections. The upper region of the structural element comprising the hinge 30 and the limbs H adjacent thereto is thus vertically variable as is indicated by the double arrow in FIG. 4*c*).

FIG. 4*b*) shows a section of the structural element without the upper limbs H and without the upper hinge 30. The frame elements are in this case formed overall by U-shaped elements from which an L-shaped section in accordance with FIG. 4*b*) is arranged contiguously and the upper limb is arranged movably.

FIG. 4*d*) shows the structural element in accordance with FIG. 4*c*) with an upwardly displaced hinge 30 having limbs H.

Figure 5:
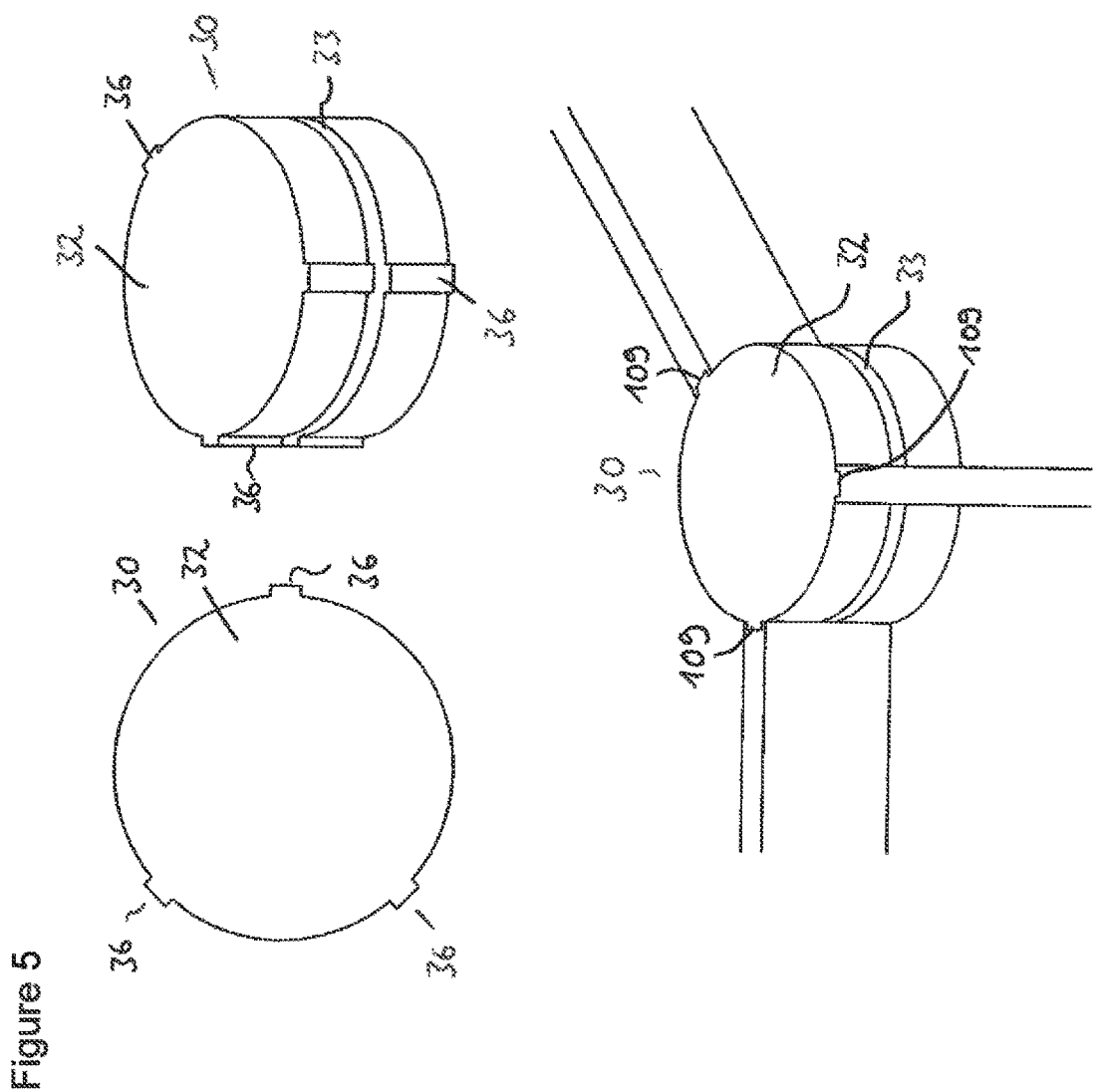
FIG. 5: a further plan view as well as a perspective view of the hinge without and with the end regions of the frame elements.

A configuration of the hinge 30 can be seen from FIG. 5 whose design generally corresponds to that of FIG. 1 in which, however, no recesses are arranged at the periphery of the base body 32, but rather projections 36 which, in the installed state of the frame elements, engage into grooves 109 which are arranged in end regions at their end faces. Reference is made in another respect to the above statements with regard to the design and to the function.

Figure 6:
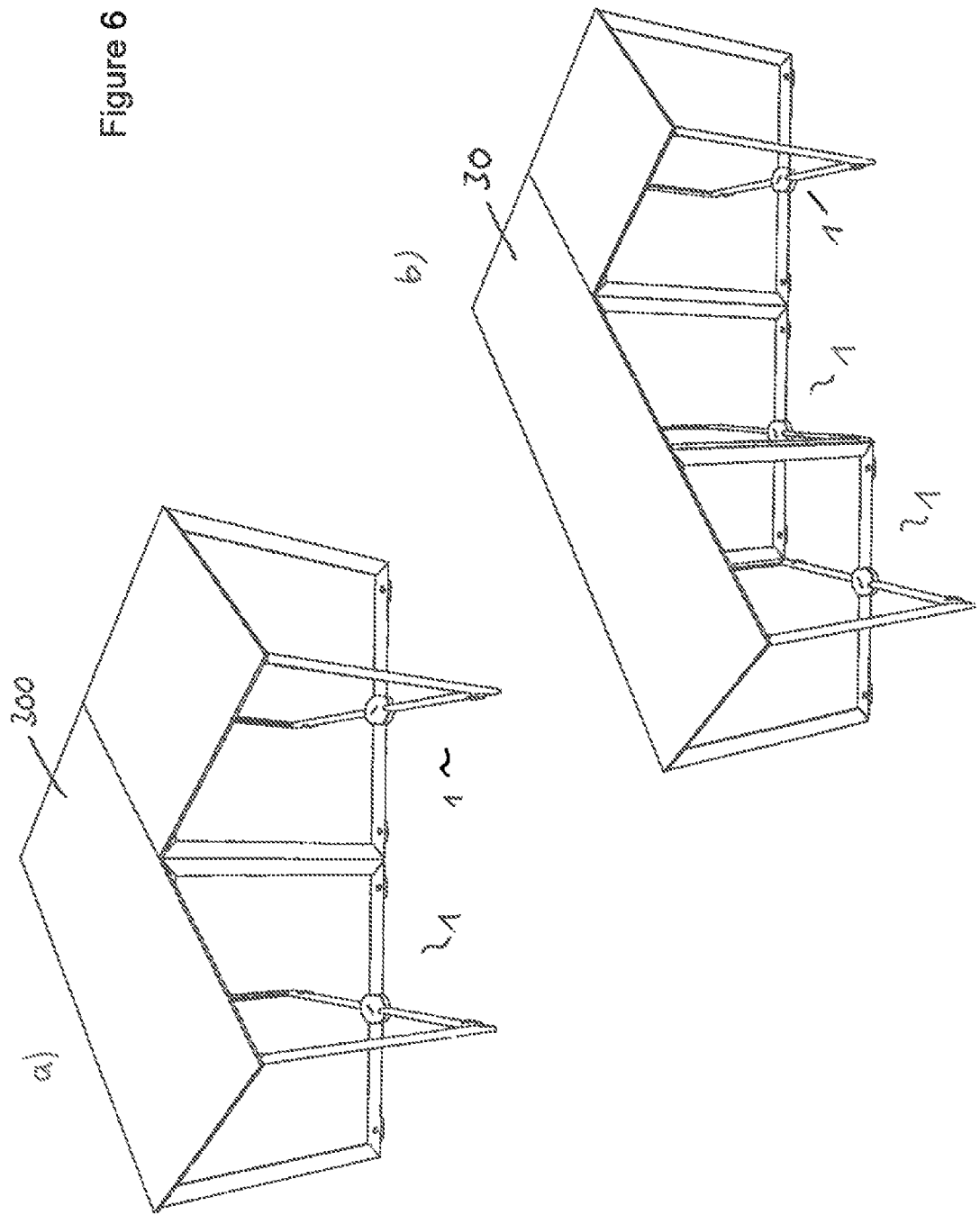
FIG. 6: perspective views of work surfaces or kitchen furniture elements in accordance with the invention.

FIG. 6*a*) shows a work surface 300 which lies on two structural elements 1 arranged next to one another, with the structural elements 1 being arranged such that they are only connected to one another at a respective vertical limb. FIG. 6*b*) shows an arrangement in which two structural elements 1 are arranged next to one another and a further structural element is arranged offset as in FIG. 6*a*), whereby a correspondingly longer work surface can be realized.

Figure 7:
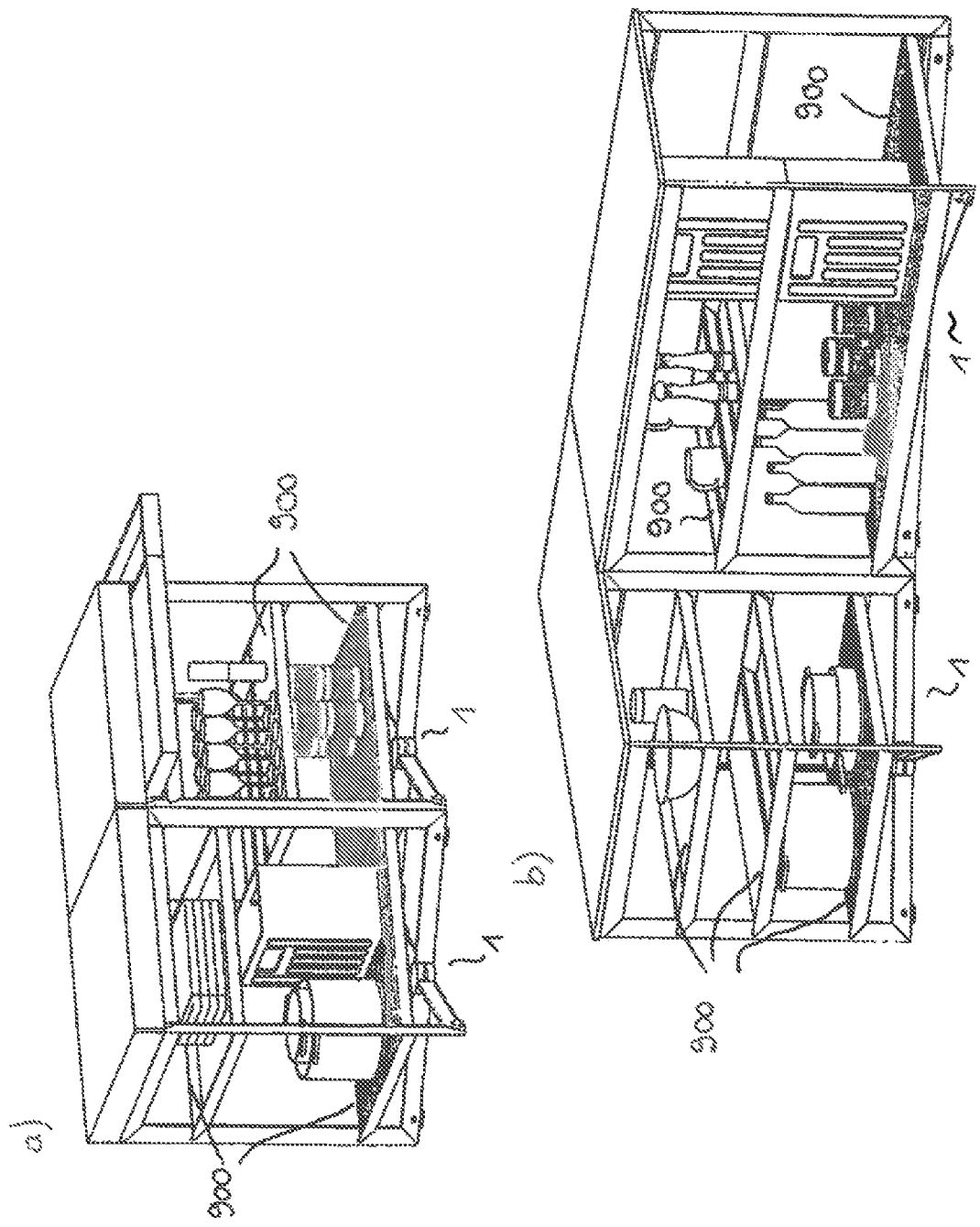
FIG. 7-9: perspective views of kitchen furniture elements in accordance with the invention.

FIG. 7*a*) discloses a structural element 1 in whose inner space spanned by the frame elements a plurality of functional elements in the form of storage shelves 900 are arranged which can be pulled out of and pushed into the inner space. While two structural elements 1 having the same dimension are arranged next to one another in FIG. 7*a*), a structural element which is square in plan view and a rectangular structural element 1 are arranged in FIG. 7*b*) such that they are only connected to one another at a vertical limb.

Figure 8:
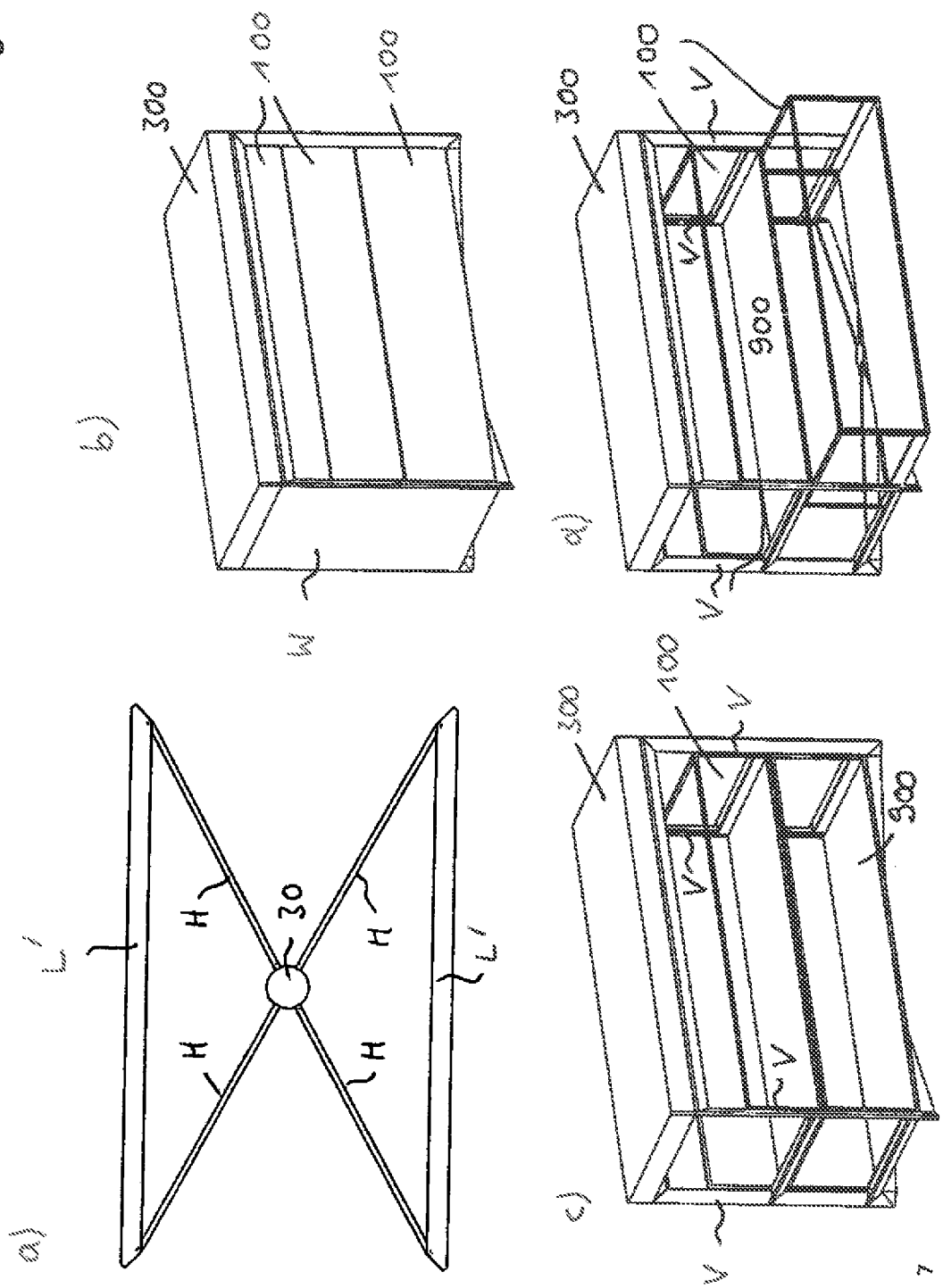

FIG. 8*a*) shows a structural element 1 in the plan view in a rectangular shape. As can be seen from FIG. 8*a*), struts or runners L' extend on two oppositely disposed sides of the structural element 1 between the vertical limbs. FIG. 8*b*) to 8*d*) show structural elements 1 or furniture elements 1 which are built up on the basis of the structural element 1 in accordance with FIG. 8*a*) and which have storage shelves 900 and drawers 100 in the space spanned by the frame elements. The work surface 300 forms the upper end of the structural element 1.

As can be seen from FIG. 8*b*), the structural element 1 can have a lining, for example in the form of lateral cheeks W and/or also in the form of a rear wall. The basic structure of the furniture element in accordance with FIG. 8*b*) as well as also in accordance with FIGS. 8*c*) and 8*d*) is formed by the structure shown in FIG. 8*a*). This is largely hidden in the case of FIG. 8*b*).

Figure 9:
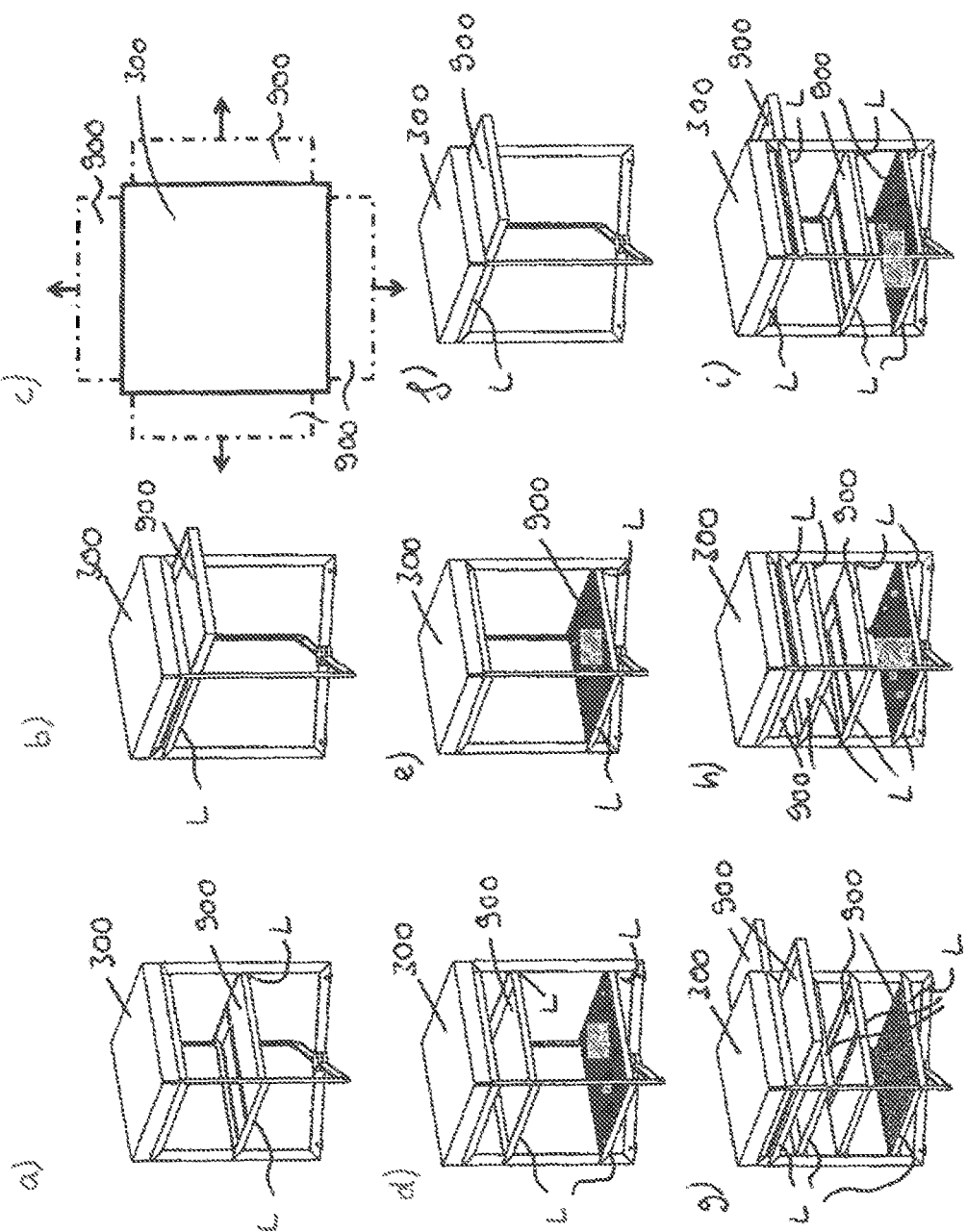

FIG. 9 shows in the illustrations 9*a*) to 9*i*) different variants of furniture elements 1 which are all built up on a basic structure such as is shown in FIG. 4*d*). In this respect, the horizontal limbs H can be arranged fixed or displaceable relative to the vertical limbs V. Storage shelves 900 which are arranged either fixed or movable on struts L can be located in the space spanned by the frame elements, with the struts L extending between two adjacent vertical limbs V of the frame elements. The storage shelves 900 can be planar as can be seen from FIGS. 9*f*), 9*g*) or can also have a depression which is surrounded by a margin such as can be seen from FIGS. 9*b*), 9*d*), 9*g*) and 9*i*). The storage shelves 900 can be formed with a smooth surface or also as a grating in accordance with FIGS. 9*d*), 9*e*), 9*g*), 9*h*) and 9*i*).

FIG. 9*a*) discloses an embodiment in which a storage shelf 900 is arranged at approximately half the height of the structural element 1. In the embodiment in accordance with FIGS. 9*b*) and 9*f*), this region is free and the storage shelf is located directly beneath the work surface 300 which respectively forms the upper termination in the embodiments shown.

It is indicated in FIG. 9*c*) that the storage shelf or shelves can be pulled out in all directions (to the front, rear, right, left) as required.

The struts L are arranged at the front and rear with respect to the topmost storage shelf 900 in FIG. 9*b*) so that said storage shelf is laterally displaceable. A displaceability to the front and rear results with respect to the storage shelf 900 second (from the top) since the runners for this shelf are arranged to the right and to the left.

In the embodiments in accordance with FIG. 9, the storage shelves 900 are each disposed in their two lateral regions on struts L which each connect two vertical limbs V of the frame elements located behind one another to one another. The design and the arrangement of the struts will be explained in more detail with reference to FIG. 13.

Figure 10:
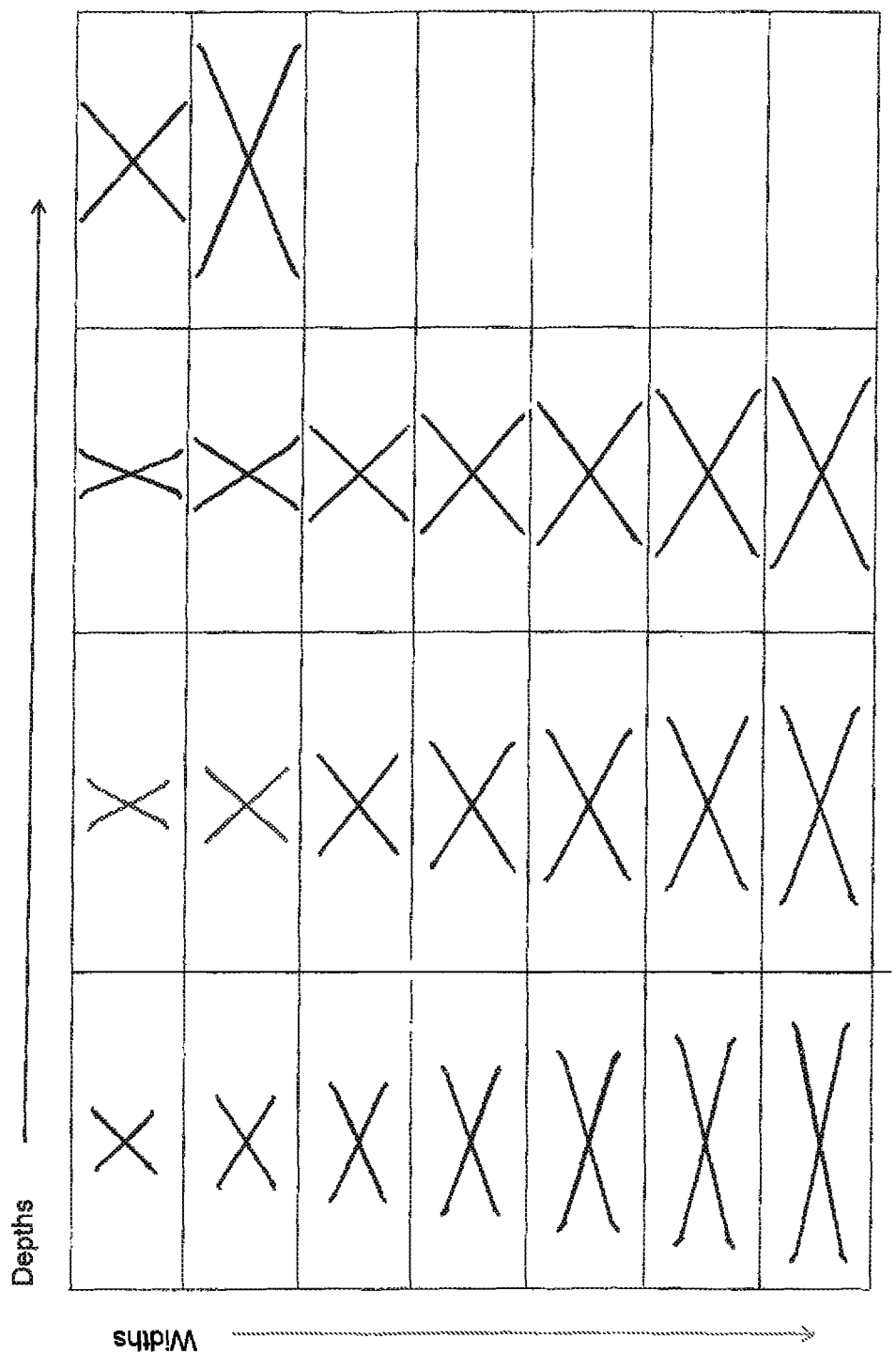
FIG. 10: schematic view of kitchen furniture elements with different widths and depths.

It can be seen from FIG. 10 that a large variability with respect to the shape or the spatial extent can be realized due to the structural element in accordance with the invention. A system of furniture elements can be provided with a comparatively small effort by the length, height and the angles of the frame elements with respect to one another and said system can be provided with an interior and/or cheeks, work surfaces, hobs, garbage, etc. as desired.

Figure 11:
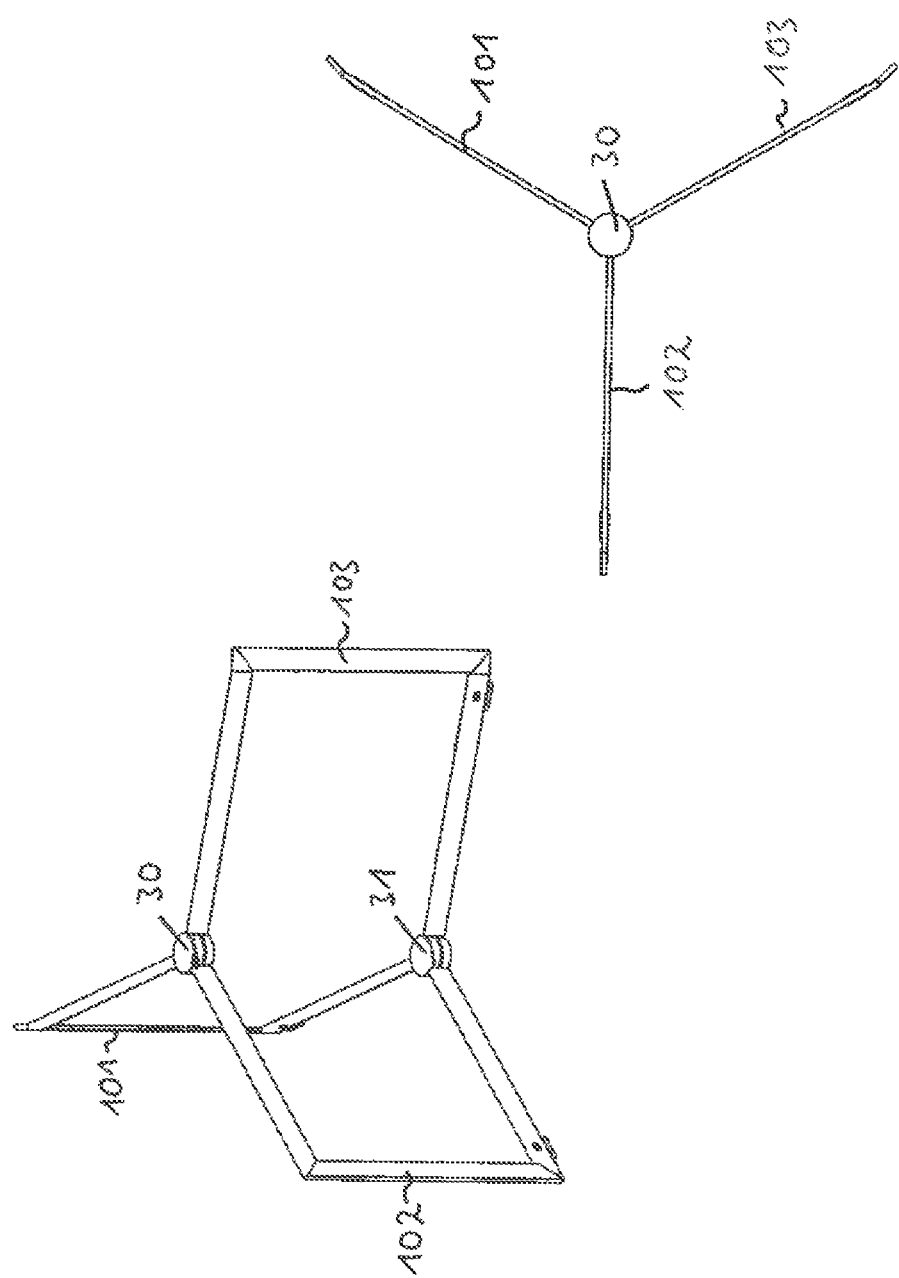
FIG. 11, a perspective view and a plan view of a structural element with three 12: frame elements.

FIG. 11 illustrates a structural element 1 having three respectively U-shaped frame elements 101, 102, 103 which are pivotable or movable relative to one another by means of two hinges 30, 31.

Figure 12:
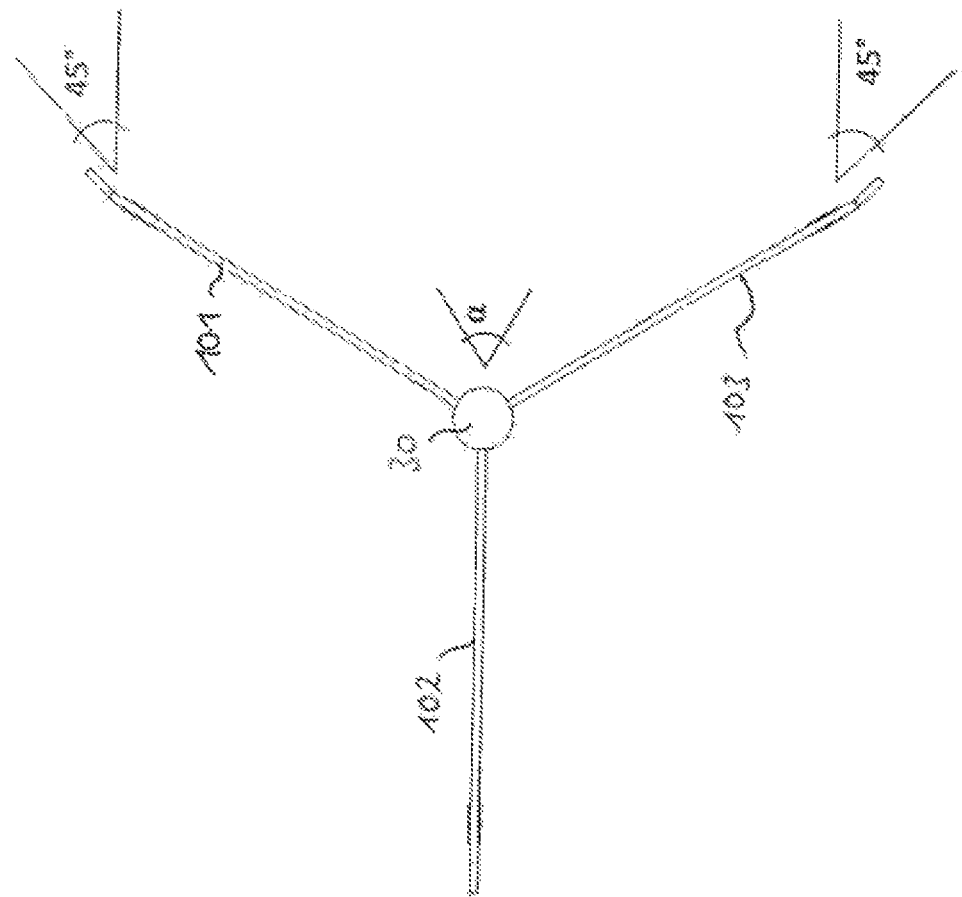

As can in particular be seen from FIG. 12, the vertical limbs V in two of the frame elements 101, 103 are inclined relative to the longitudinal extent or to the plane of the horizontal limbs H, i.e. they do not extend in alignment with the horizontal limbs H. If this were the case, the mutually facing surfaces of the vertical limbs would have an angle of 120° with respect to one another. Since a different angle is desired, an angle of 90° in the embodiment shown here, the vertical limbs V are angled such that the desired angle between them results. This does not only bring about the advantage named with respect to FIGS. 20 to 23, but also that advantage that the end regions of the struts L can always be chamfered at an angle of 45°, i.e. can be used universally.

Figure 13:
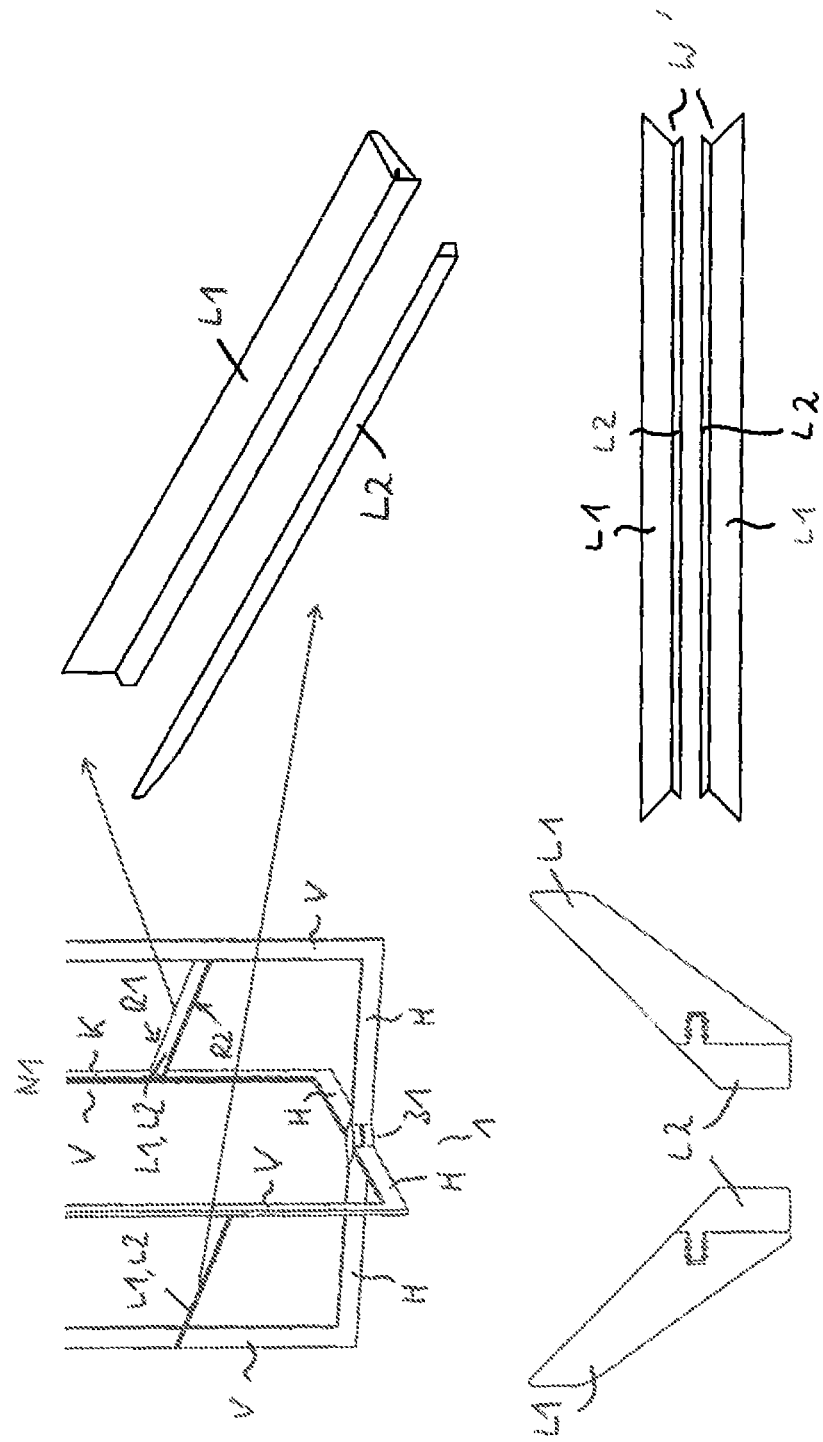
FIG. 13: a perspective view of a structural element in accordance with the invention as well as different views of the struts extending between the limbs.

FIG. 13 shows the arrangement and design of the struts L. They are composed of two parts L1 and L2 which are connected to one another after being set at the vertical limbs V. This has the background that the part L1 provided with the 45° angle at both ends is first placed between two vertical limbs V in the direction R1 and then the second part L2 is set on from the other side in accordance with the direction R2. It is thus possible that the struts L extend around an edge K of the vertical limbs V. As can be seen from FIG. 13, the two parts L1, L2 include an angle W' in which the edge K of the vertical limbs is located.

It is possible in this manner that the struts L run in a groove N1 which is located in the edge K. A height adjustability of the struts L is thus present.

Figure 14:
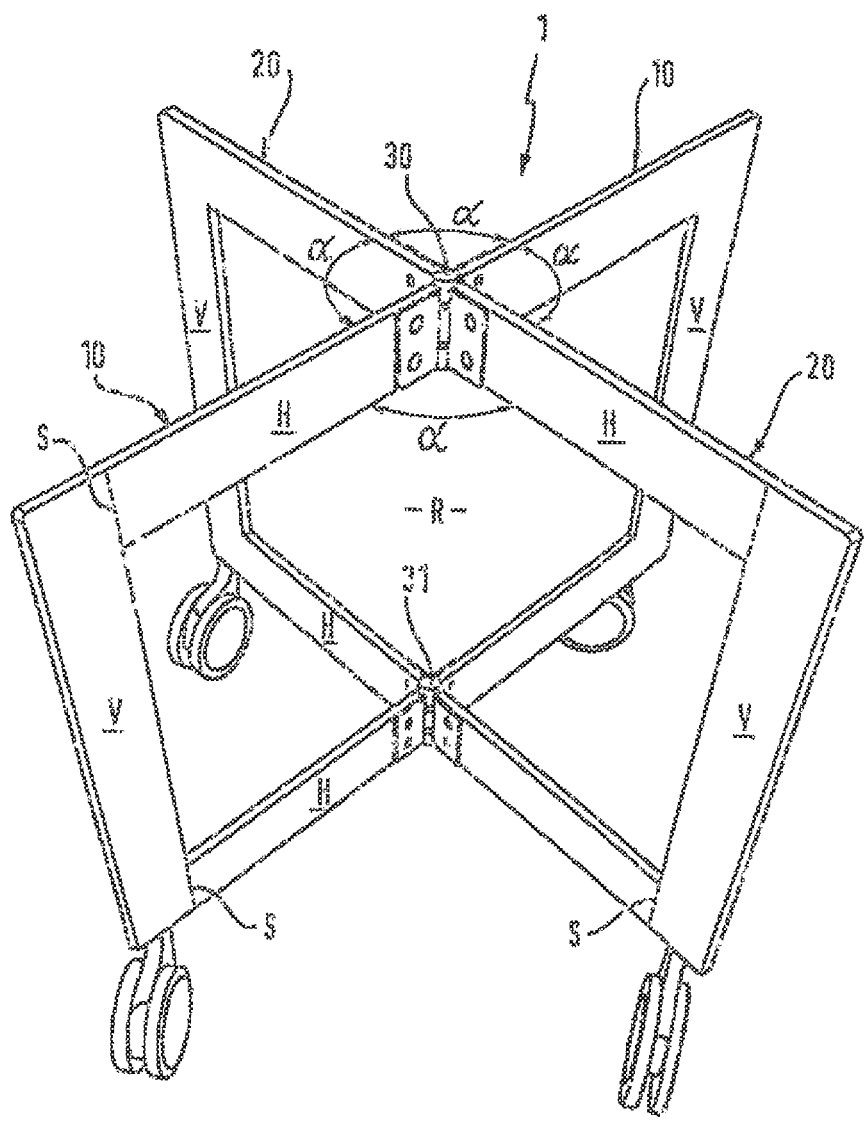
FIG. 14: a perspective view of the structural element with a first angle α between the two frame elements.

FIG. 14 shows in a perspective view a structural element 1 in accordance with the invention comprising two frame elements 10, 20 which are each formed as peripheral frames and which are pivotable relative to one another via two hinges or joints 30, 31 arranged spaced apart from one another in the vertical direction of the structural element. In this case, the peripheral elements respectively interrupted by the hinges 30, 31 are called frame elements 10, 20. It would equally be conceivable and covered by the invention only to call those respective elements frame elements which extend up to the hinges 30, 31. In this case, in accordance with FIG. 27, four frame elements would be provided which are each formed as lying Us. The ends of the limbs of the U are each connected—as can be seen from FIG. 27—to the hinge 30, 31.

As stated above, the term "frame element" is to be understood broadly and covers every element of any desired design which is directly or indirectly connected to the hinge(s) 30, 31. The frame element can, for example, be peripheral, i.e. O-shaped or, for example, U-shaped, V-shaped, L-shaped, etc. It can comprise one or more elements and be straight or curved.

The hinge 30, 31 in the embodiment shown here comprises a central axis about which two elements are rotatable relative to one another, with the two elements each having fastening lugs to which the end regions of the frame elements are fastened. It is explicitly pointed out that it is in this respect only an example of a hinge which does not restrict the invention. Any other desired embodiments of hinges and joints are also covered by the invention which allow a relative movement or pivot movement of frame elements.

The term "hinge" or "joint" is thus to be given a broad interpretation and comprises any desired means which allows a relative movement and preferably a pivot movement of the frame element(s).

As can be seen from FIG. 14, the two frame elements 10, 20 extend beyond the hinges 30, 31, i.e. do not end there, although such an embodiment is also covered by the invention.

In the embodiment shown in FIG. 14, the angles α between the frame elements 10 and 20 each amount to 90°, i.e. the two frame elements 10, 20 are perpendicular to one another.

It is possible easily to vary the angles between the frame elements due to the pivotability of the two frame elements 10, 20 relative to one another. Such an embodiment with angles changed with respect to FIG. 14 is shown, for example, in FIG. 15. Starting from the state in accordance with FIG. 14, the two frame elements 10, 20 have been moved toward one another in the region at the front facing the observer so that two acute angles β and two obtuse angles γ result, as can be seen from FIG. 15.

Figure 15:
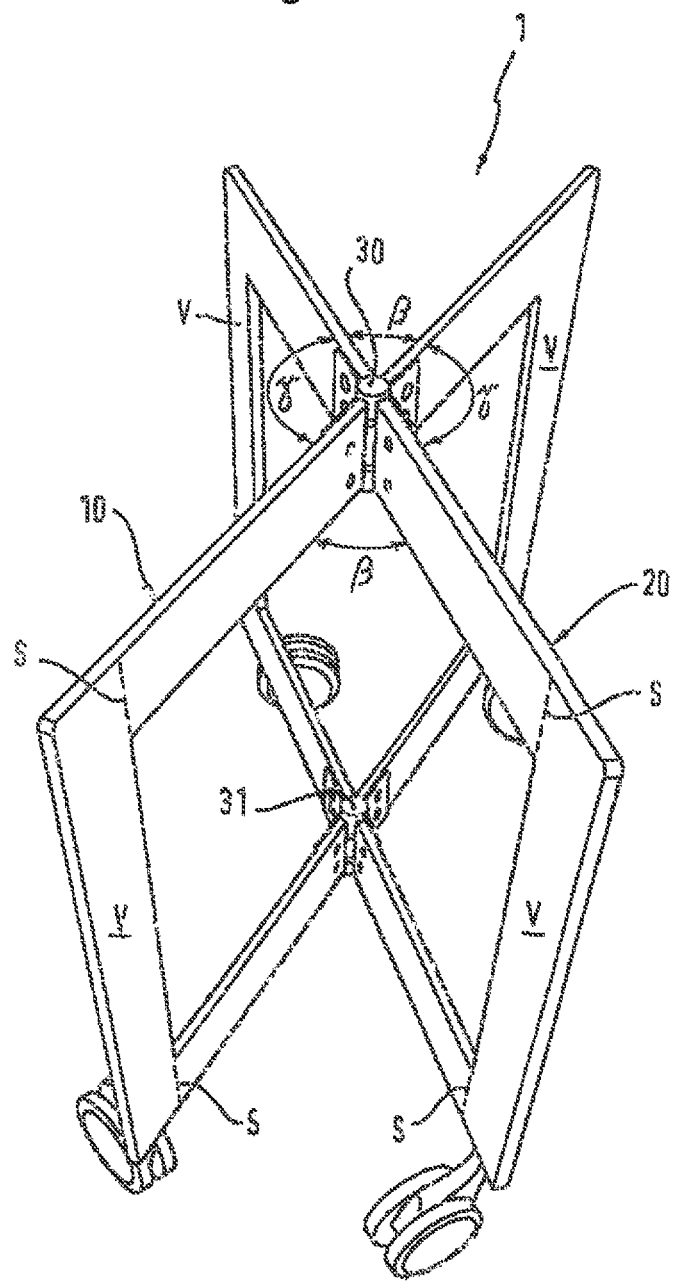
FIG. 15: a perspective view of the structural element with two angles β, γ between the two frame elements.

Due to the fact that the angles between the frame elements are thus not fixed, but are variable as required, i.e. depending on the desired dimensioning of the structural element 1, the mutually facing vertical limbs V are likewise at different angles with respect to one another, as can be seen from a comparison of FIGS. 14 and 15. If identical hinges for a door extending between the limbs or for another functional element were, for example, installed at these vertical limbs V, alignments of the closed door would result which would be unwanted since the door would not extend between the vertical limbs under certain circumstances, but would rather project out of or be recessed from this connection plane.

To prevent this, provision is made in a preferred embodiment of the invention that the vertical limbs V are separated in total or in part, for example, along the dashed line S in FIGS. 14 and 15 and/or are arranged at an angle relative to the remaining frame element. The vertical limbs V can thus extend in an angled manner differing from the positions shown in FIGS. 14 and 15 and can thus not lie in the plane of the remaining associated frame element, but rather in a plane which extends at an angle thereto.

Figure 20:
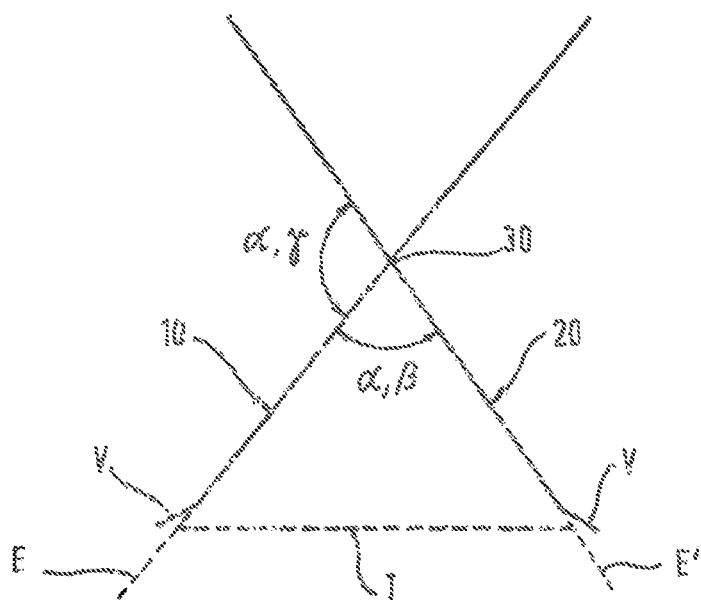
FIG. 20: a schematic plan view of the structural element with angled vertical limbs V.

This results, for example, from FIG. 20. A schematic plan view of the structural element is shown in this Figure. The plane in which the frame elements 10, 20 lie or the plane spanned by these frame elements is marked by the reference symbols E and E'. It can furthermore be seen from FIG. 20 that the vertical limbs V of the frame elements do not lie in the plane E or E', but rather extend at an angle relative thereto. This can relate to the total vertical limb V or also only to a part region thereof.

Figure 21:
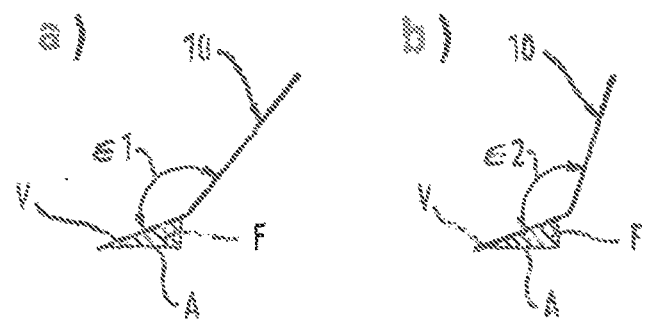
FIG. 21: schematic plan views of the end regions of the frame element with differently angled vertical limbs V.
Figure 22:
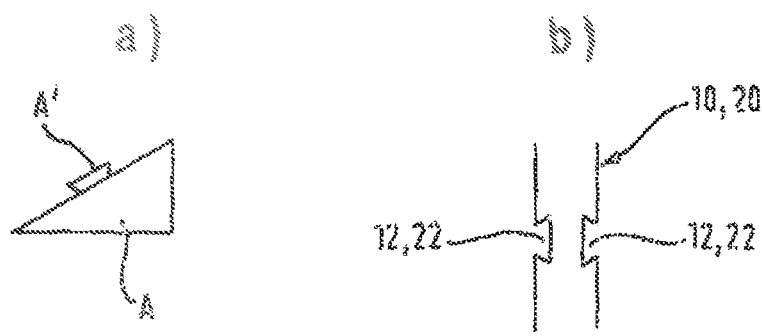
FIG. 22: a schematic view of an adapter with a projection and of the frame element with grooves.

Adapters A are fixed to these vertical limbs V in the embodiment shown and have a surface F in accordance with FIG. 21 which is perpendicular to the connection plane with respect to the adjacent frame element and a hinge for a door extending between the adjacent frame elements can be installed thereat, for example. The door is indicated by a dashed line T in FIG. 20.

FIG. 21 shows two embodiments having different angles α, β which are expressed in a different direction of the frame element 10. While the frame element 10 extends in a flatter manner in FIG. 21a), it extends more steeply in accordance with FIG. 21b). In order to achieve that the adapter always has the same orientation and that thus always the same adapter and thus also the same hinge can be used independently of the angle α, β, the angle ε1, by which the vertical limb is angled is larger in accordance with FIG. 21a) than the angle ε2 in the embodiment in accordance with FIG. 21b). Different angles α, β between the frame elements can thus be compensated by different pronounced angled regions ε of the vertical limbs.

As can be seen from FIGS. 21a) and 21b), the adapter always has the same orientation independently of the alignment of the frame elements or independently of the angle α, β.

As can be seen from FIGS. 14 and 15, the frame elements 20, 30 are formed by two respective vertical limbs V and by two respective horizontal limbs H which thus have the shape of a peripheral frame overall which is inwardly hollow so that overall a space R is spanned by the two frame elements.

Figure 16:
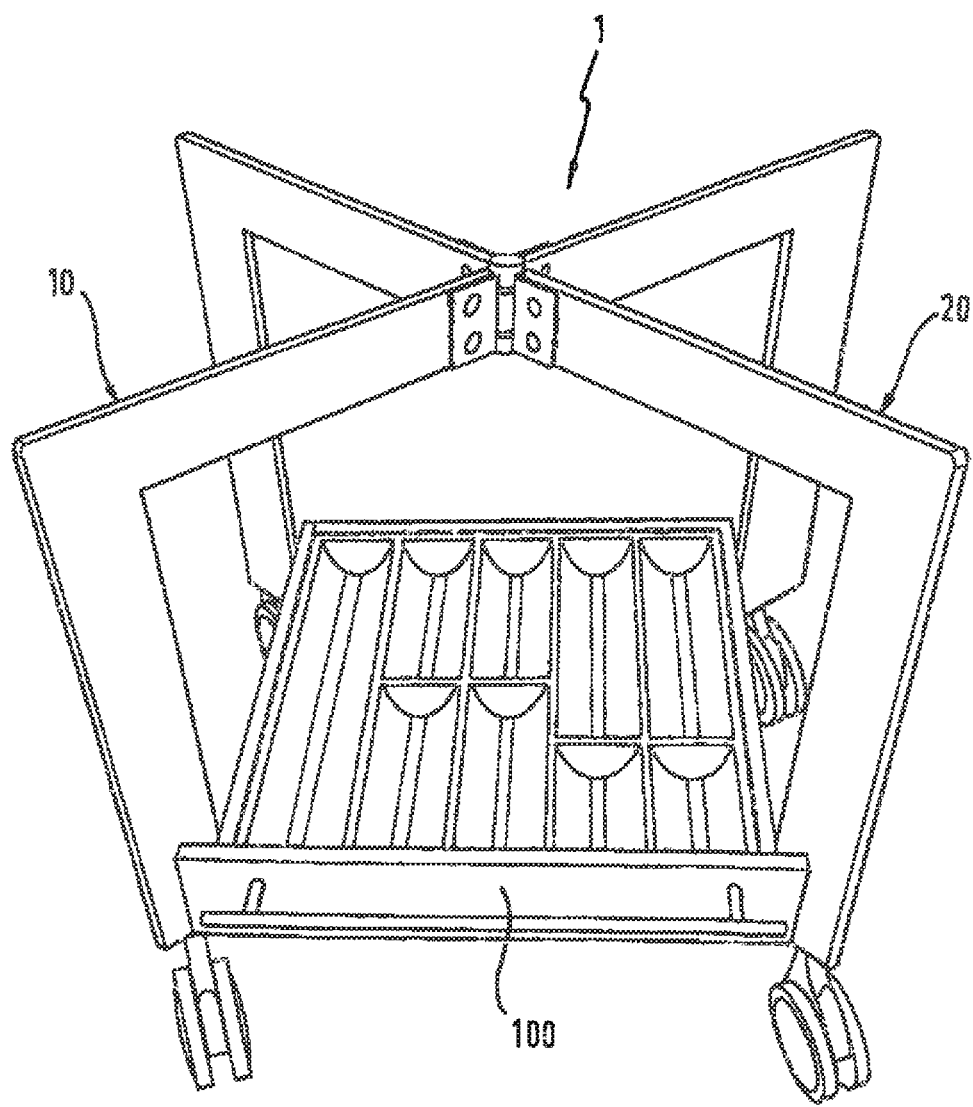
FIG. 16: a perspective view of the structural element with a drawer received in the space spanned by the frame elements.

To be able to receive functional elements such as drawers 100 in accordance with FIG. 16 in this space R or to be able to fasten corresponding drawer runners, adapters A are arranged, as explained with respect to FIG. 21, at the angled vertical limbs V and are aligned such that a suitable angle results overall for the arrangement of the guide rails, hinges or the like.

The arrangement of adapters is not restricted to the vertical limbs V, but can also take place at the horizontal limbs H. It is, for example, conceivable to arrange rollers or adjustment feet at the adapters which are located at the horizontal limbs.

As can be seen from FIGS. 22a) and 22b), the frame elements 10, 20 have grooves 12, 22 at one or both sides into which the projections A' of the adapter A can be inserted. These grooves can be formed in the manner of dovetails, for example. This applies accordingly to the projections A'.

It is possible in this manner to arrange adapters at the desired points at the frame elements and in particular at their vertical limbs V. One or more adapters per frame element can generally be used.

In a preferred embodiment of the invention, the adapters are identical for all angular arrangements of the frame element such that the required angle for the drawer or for the hinge or the like can be set by the angle of the angled section V, as was explained with respect to FIG. 21.

The case is generally also conceivable, however, that the angle of the angled section V is always identical and differently configured adapters are used, which brings about the disadvantage, however, that the adapters cannot be designed as nonvariable parts.

To achieve a correct angle specification of the limb V, a metal insert or another insert can be used which connects the section V to the adjacent region of the frame element disposed in the plane E, E' of the frame element 10, 20. The use of an adapter is a conceivable embodiment of the invention. The described angled portion can also be relevant to other cases and is not restricted to the use with an adapter.

Figure 23:
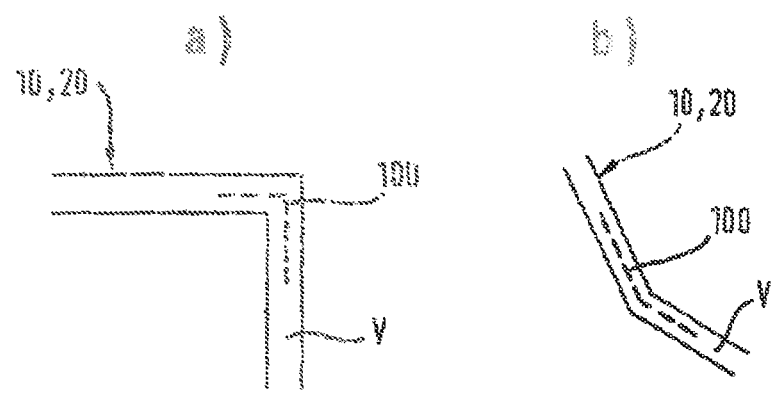
FIG. 23: a schematic view of the metal insert in the corner region between the vertical and horizontal limbs of the frame element.

The use of an insert results, for example, from FIG. 23. The metal insert element there is marked by the reference numeral 100. FIG. 23a) shows the arrangement in a side view and FIG. 23b) in a schematic plan view. As can be seen from FIG. 23b), the angled section V follows the angle specification by the angled metal insert 100.

Figure 17:
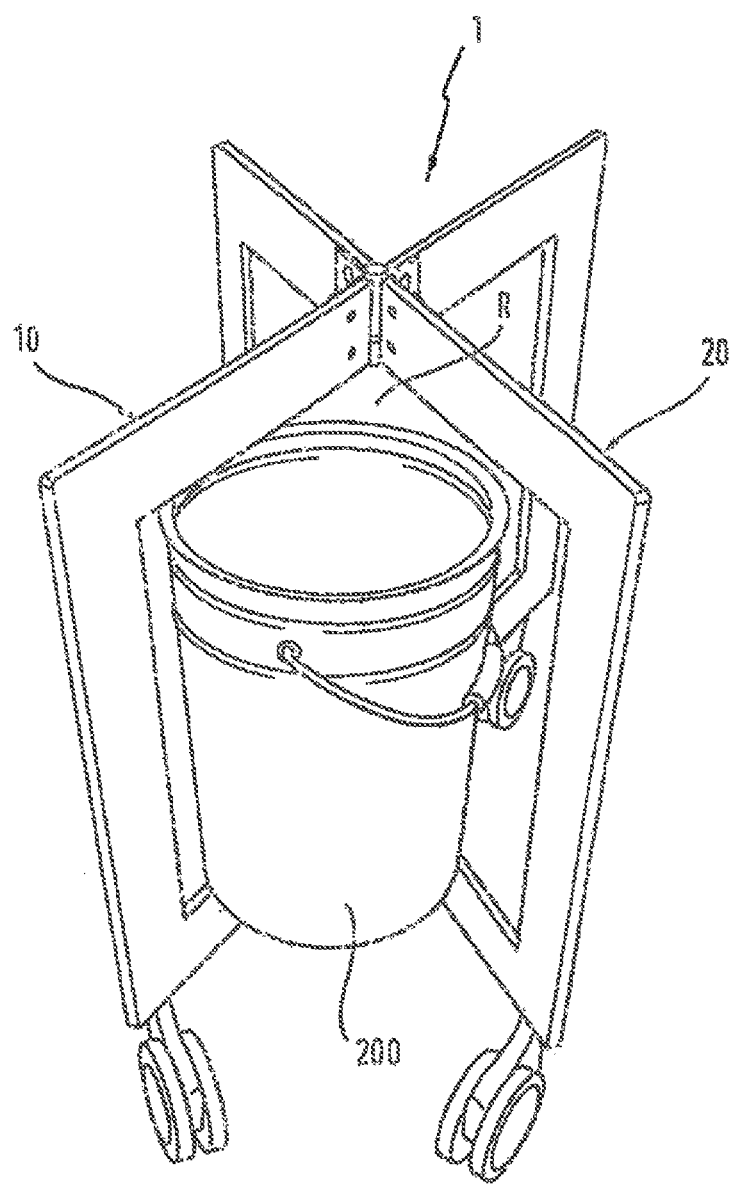
FIG. 17: a perspective view of a structural element with a container arranged in the space spanned by the frame elements.
Figure 18:
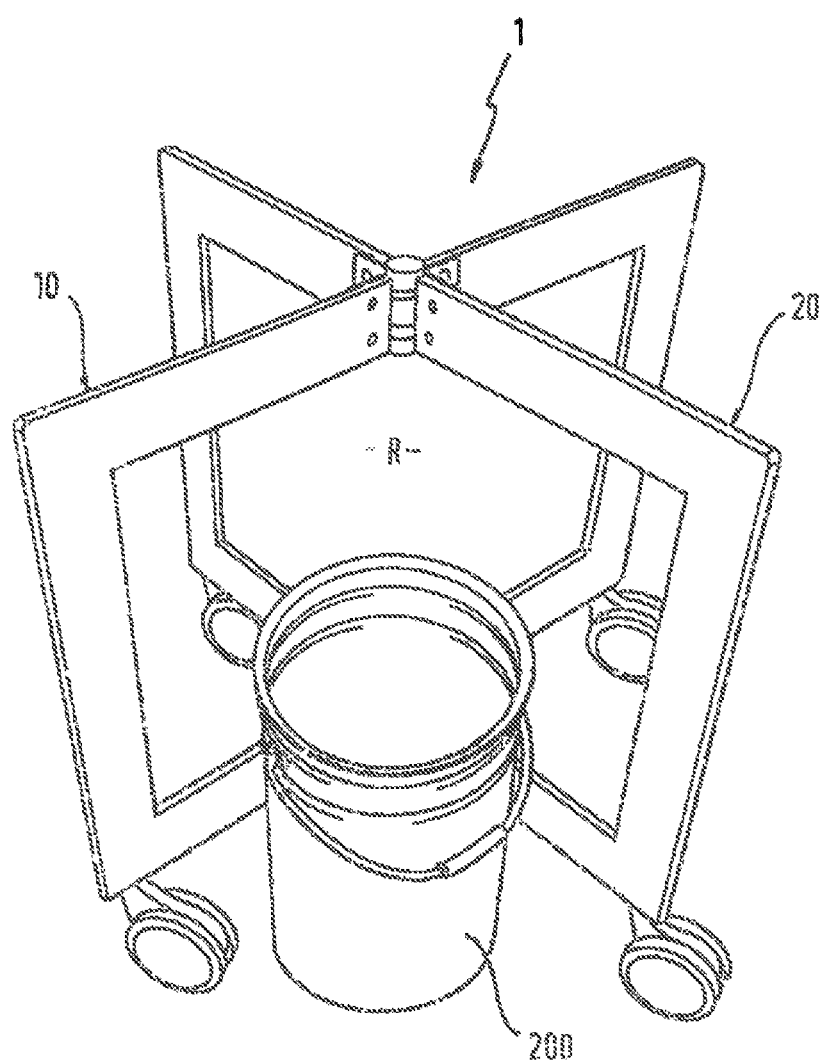
FIG. 18: a perspective view of the structural element with a container arranged in the space spanned by the frame elements with a positioning differing with respect to FIG. 17.

FIG. 17 shows an embodiment in which a container 200 such as a trash can is arranged in the reception space R which is formed by the frame elements 10, 20. This can also be arranged in the floor region in accordance with FIG. 18.

It must furthermore be pointed out that the wheels which are shown in the Figures are of an optional nature and can also be omitted, which is a preferred embodiment of the invention.

Figure 19:
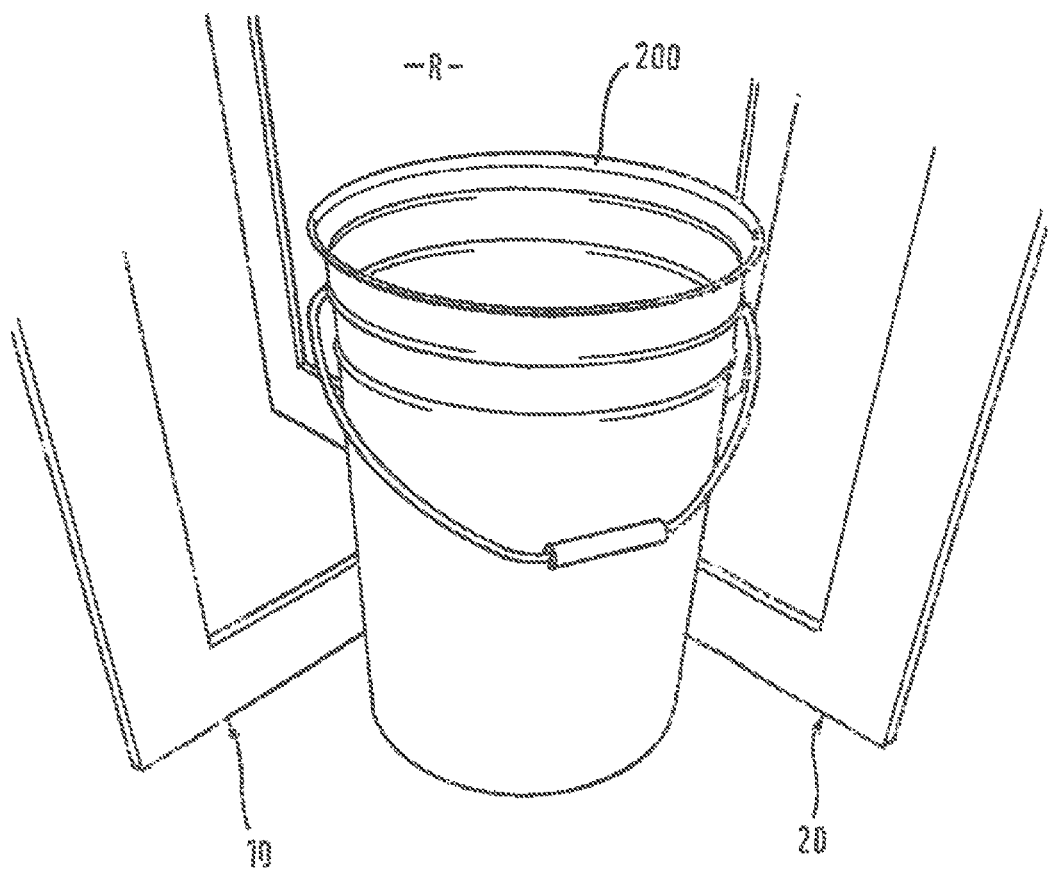
FIG. 19: an enlarged view of the lower section of the structural element without rollers with a container arranged through the space spanned by the frame elements.

Such a preferred embodiment without wheels results from FIG. 19, for example. The structural element optionally stands on the floor via adjustment feet in this Figure. The structural element is also formed in this case by at least two frame elements which are connected to one another via hinges and in whose reception space a trash can or another container can be arranged.

It is possible by the present invention to form a kitchen or kitchenette which is modular, simple to configure and expandable. This can be done, for example, in that a plurality of the structural elements shown or in accordance with the invention are joined together, for example above one another or also next to one another or in that they are arranged spaced apart from one another and in that a work surface or other functional elements such as drawers, a sink, etc. are, for example, arranged therebetween or thereon.

It is easily possible by the simple pivotability of the frame elements 10, 20 with respect to one another, starting from a single element which is formed by the frame elements 10, 20 and by the hinge(s), to provide differently dimensioned structural elements.

It is thus possible to configure different floor units, wall units, tall units, etc. using one and the same structural element.

The structural element in accordance with the invention has a space R which is spanned by the frame elements and which can be used as a recreation space for persons or as a storage space or as a functional space for drawers, kitchen appliances, etc.

The side of the structural elements projecting toward the user can be closed by a door or flap or by the fronts of drawers or can also remain open. The lateral surfaces of the structural elements can be covered by cheeks or by an adjacent structural element.

The upper side of the structural elements can be formed, for example, by a work surface, a sink, etc. Lamps or extractors can, for example, be installed at the structural elements, for example at said adapters, and can have an upwardly extending section and a section extending at an angle thereto and are thus formed in the manner of a "gallows". The extracted fumes can be collected in the space R spanned by the frame elements, for example, and can be removed from there.

It is conceivable to use the structural element shown in the Figures as a furniture element or as a base body for a piece of furniture.

It is also conceivable to use the furniture element shown as a base body for a table or for a chair or stool or the like.

It is thus conceivable, for example, to use the side of the frame elements disposed at the top in FIG. 14 as a support surface for a table top and/or as a support surface for a seating element. In the case of a chair, a backrest and/or armrests can additionally be provided, with them likewise being able to be fixed to the frame elements and preferably to the adapters arranged thereat.

It is furthermore possible to install a rotatable element such as a turntable or the like at the lower side i.e. beneath the hinge 31, to design the structural element as rotatable relative to the floor on which it stands. A swivel chair or a rotatable table can thus be realized, for example. It is also possible to arrange a rotatable element on the upper side of the structural element shown by way of example in FIG. 14, for example to form a rotatable table top or a rotatable seat surface of a chair, stool or the like.

In a further preferred embodiment, an axle or shaft extends between the hinges 30, 31. This thus extends vertically in the state shown in FIG. 14; horizontally in the case of a structural element arranged lying.

If at least two structural elements each having at least one such axle or shaft are arranged, a peripheral belt or another peripheral element can be positioned around the two (or more than two axles or shafts), comparable to a peripheral conveyor belt, at which peripheral belt or other peripheral element one or more storage elements such as trays or unit shelves, etc. can be arranged. This belt can be arranged rotatable about the axles/shafts such that the front side of the shelf can be conveyed by the movement of the belt onto the rear side of the structural elements or vice versa. The movement of the belt can take place, for example, by one or more electric motors which e.g. drive one or both axles/shafts.

It is also conceivable to use the structural element shown by way of example in FIG. 14 as a walkable element. It is thus conceivable that the region between two adjacent vertical limbs V is used as an inlet or outlet into the space spanned by the frame elements.

Figure 24:
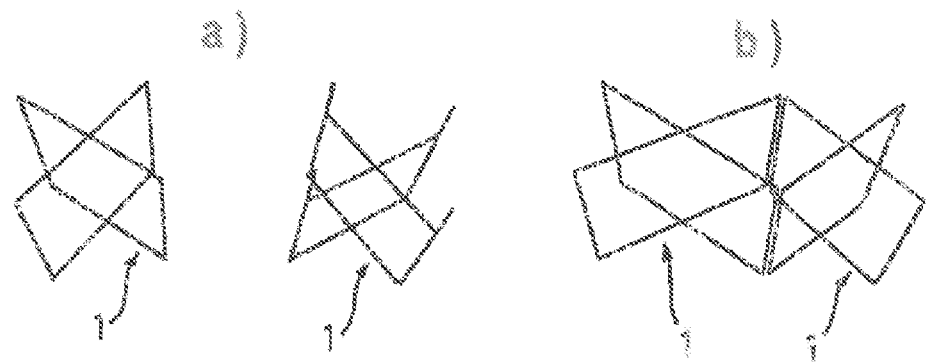
FIG. 24: different views of structural elements singly and in a set.

FIG. 24 shows different views of structural elements singly and in a set.

FIG. 24a) shows the structural elements 1 singly and FIG. 24b) in the form of two structural elements 1 connected at their vertical limbs. The above-named adapters can, for example, be used for the connection.

As can be seen from FIG. 24a), the vertical limbs can end at the level of the hinges or can extend beyond them.

Figure 25:
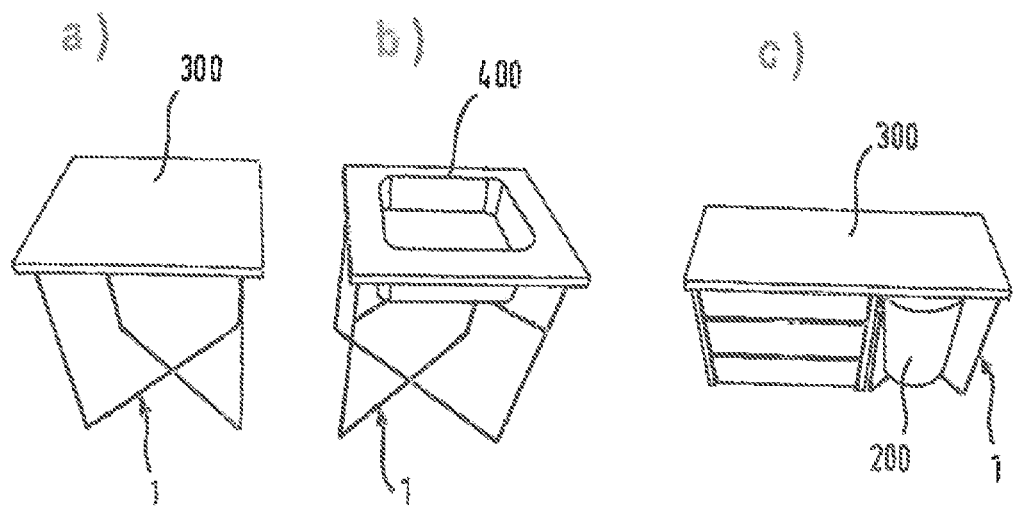
FIG. 25: different views of tables and of a sink with the structural element as a "table leg"

Different views of tables and of a sink having the structural element 1 as a "table leg" can be seen from FIG. 25. FIG. 25a) shows a table with the table top 300 and with the structural element 1 as a base frame and FIG. 25b) shows a sink module with a sink 400 and the structural element 1 as the base frame. A table with a top 300 can be seen from FIG. 25c) whose right table leg is formed by the structural element 1. A trash can 200 is located therein and can be arranged as displaceable or pivotable, for example.

Figure 26:
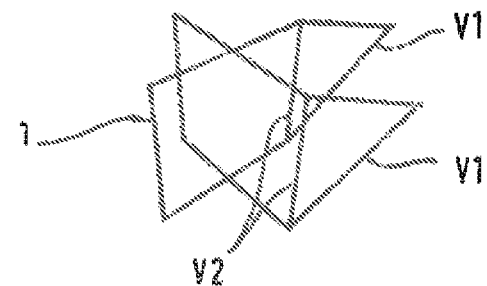
FIG. 26: a view of a structural element with limbs extending at a slope.

A view of a structural element 1 having obliquely extending limbs V1 can be seen from FIG. 26. As can be seen from FIG. 26, they do not extend in the vertical, but are rather inclined to the front relative thereto. An obliquely standing front of a furniture element is thus conceivable, for example. In the embodiment in accordance with FIG. 26, not all limbs have to be present; for example, the limbs V2 can thus be omitted.

Figure 27:
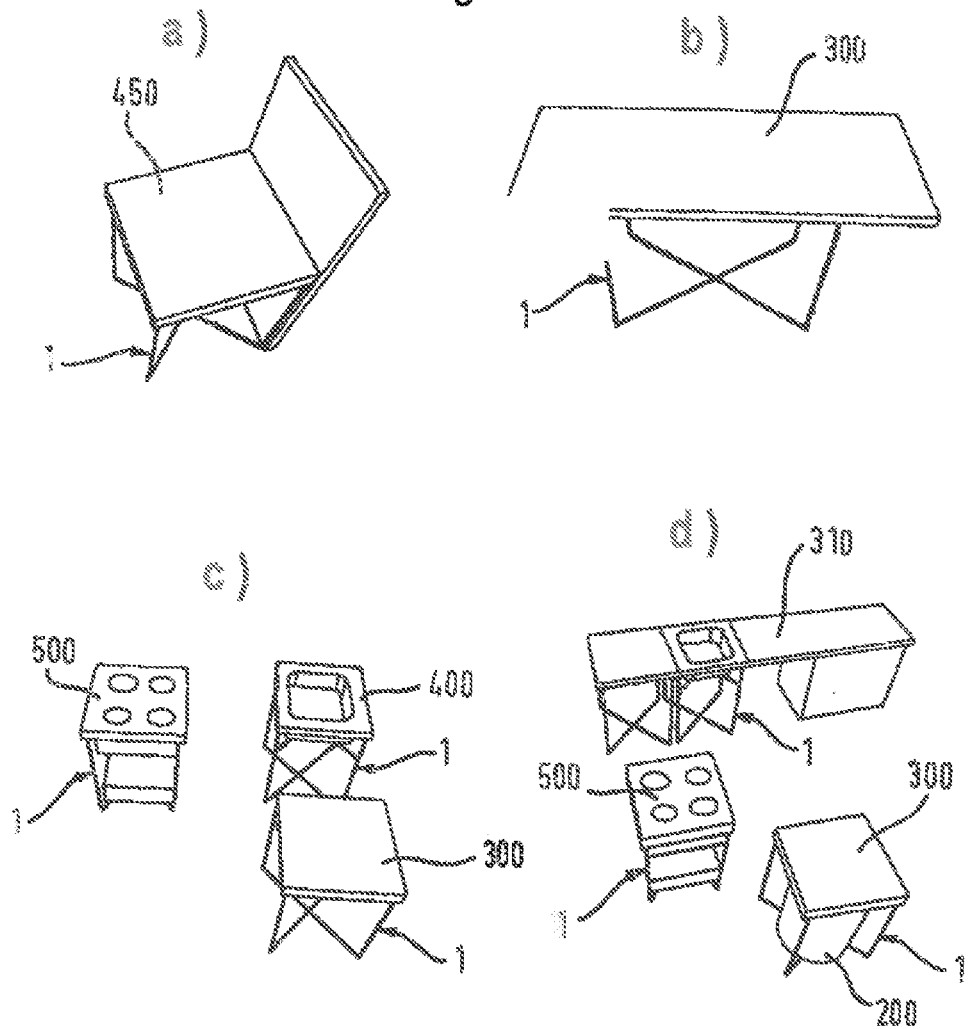
FIG. 27: different application examples of the structural element in chairs, tables, cooking areas, sinks, storage spaces.

FIG. 27 shows different application examples of the structural elements in chairs, tables, cooking areas, sinks, storage spaces. The structural element 1, which forms the base for a seat surface 450 in the case of FIG. 27a, the base for a table top 300 in the case of FIG. 27b and the base for a hob 500 or for a sink 400 in the case of FIG. 27c, serves as the supporting base structure.

In general, the structural element in accordance with the present invention can be used with each of the modules or pieces of kitchen furniture such as are disclosed in the application 10 2013 014 895 of the applicant. This application relates to kitchen furniture having a useful surface and at least one functional element arranged above the useful surface, with the functional element being arranged at a carrier part and with the carrier part comprising a pole fastened to the kitchen furniture and an arm adjoining the pole. The useful surface can be a sink area, with the carrier part being formed by a faucet and with the functional element being an illuminant and optionally furthermore a holder.

The named application furthermore relates to kitchen furniture having a useful surface and at least one functional element arranged above the useful surface, with the functional element being arranged at a carrier part and with the carrier part having a trunk which is arranged at the piece of kitchen furniture within the useful surface and whose upper end extends above the useful surface. In this respect, the functional element can be of mushroom shape and can have an umbrella adjoining the trunk and/or the trunk can be arranged in the central region of the useful surface. It is also conceivable that the useful surface is a hob, a sink area or a preparation area and/or that the functional element is selected from the group extractor hood, illuminant, operating element and power source and/or that the useful surface is a hob and that the functional elements are an extractor hood and optionally furthermore an illuminant and/or operating elements. It is furthermore conceivable that the useful surface is a preparation area and the functional elements are illuminants and optionally furthermore power sources and/or operating elements and/or an extractor hood.

The aforesaid features are also preferred features of the present invention individually or also in combination. The applies accordingly to the further disclosure content of DE 10 2013 014 895 to which reference is herewith made.

FIG. 27d shows an arrangement of individual elements as well as a work surface 310 which is supported by a drawer module at the one side and by a structural element 1, on the other side.

Figure 28:
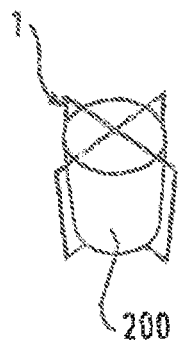
FIG. 28: a representation of the structural element with a garbage can received therein.

FIG. 28 shows an illustration of the structural element 1 having a trash can 200 received therein.

Figure 29:
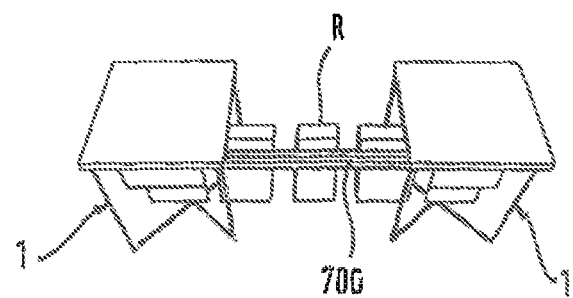
FIG. 29: a representation of two structural elements spaced apart from one another with a peripheral strap arranged therebetween.

FIG. 29 shows an illustration of two mutually spaced apart structural elements 1 having a belt 700 which is arranged therebetween and which runs around and is preferably rotatable and at which different functional elements such as shelves R can be located. For instance, depending on the position of the belt 700, the desired elements can be directed toward the front side or other elements can be directed to the rear side of the belt 700. The belt is wound around two axles which are each located between the upper and lower hinges of each of the structural elements 1. These axles preferably extend vertically.

Figure 30:
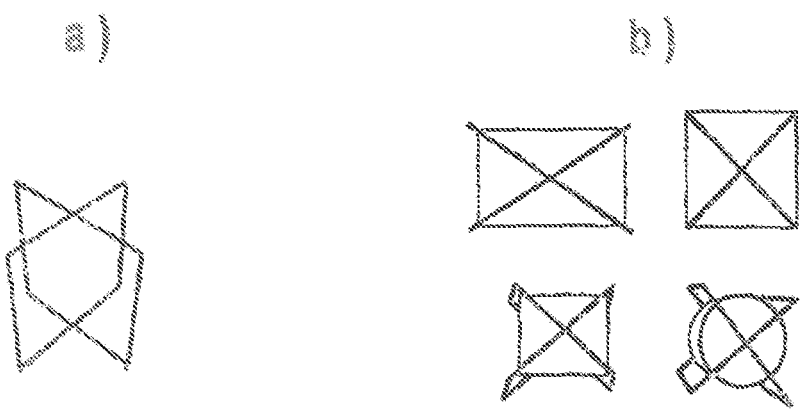
FIG. 30: a further perspective view of the structural element and plan views of different furniture elements with structural elements.

FIG. 30 shows a further perspective view of the structural element (FIG. 30a) and plan views of different furniture elements having structural elements in accordance with the invention (FIG. 30b). As can be seen from FIG. 30b), the space spanned by the frame elements and/or the structural element can be used as a support element for e.g. a table top.

Figure 31:
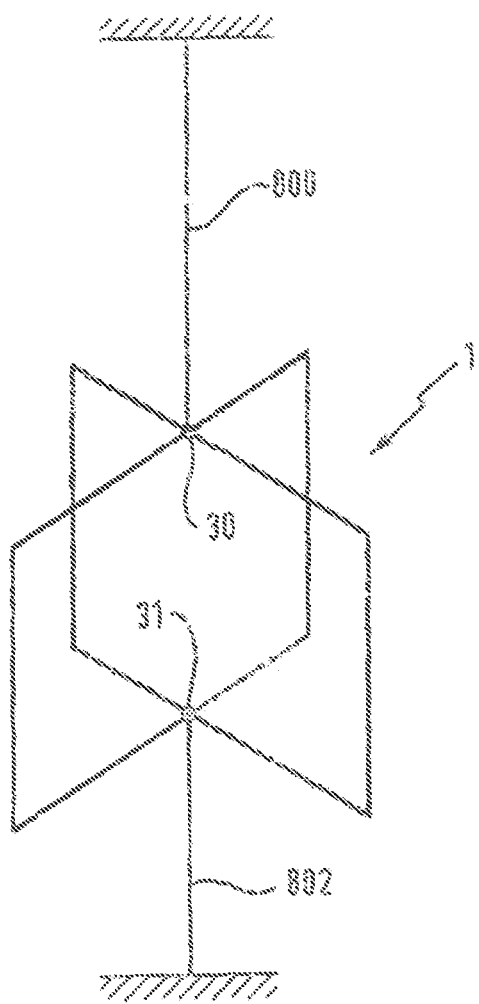
FIG. 31: a schematic view of a structural element which is held between two walls, bottom, top, etc.

FIG. 31 shows an arrangement in which the structural element 1 is arranged between the floor and ceiling of a space or the like such that the connection of the structural element 1 to the floor and to the wall takes place by means of rods 800, 802. These rods 800, 802 can be arranged, for example, at the joints 30, 31 of the structural element.

The rods 800, 802 can be fixedly connected to the floor and ceiling and rotatably connected to the structural element 1, for example by means of the joints 30, 31 or in another manner, such that the structural element 1 is rotatable relative to the floor and ceiling.

The structural element is preferably arranged rotatable by 360° relative to the floor and ceiling.

It is also conceivable to connect the rods 800, 802 fixedly, i.e. not rotatably, to the structural element 1 and to form them as rotatable relative to the floor and to the ceiling. This can be implemented, for example, by means of turntables or the like which are rotatable relative to the floor and to the ceiling and at which the rods 800, 802 are arranged.

Instead of a single structural element 1, a plurality of structural elements 1 can also be arranged next to one another or above one another, optionally connected by one or more further rods in the arrangement in accordance with FIG. 31.

The above statements apply accordingly to a cover which surrounds the structural element except for an opening. Such a cover, not shown in FIG. 31, can also be arranged as rotatable as described. The cover can be arranged as rotatable relative to the floor and to the ceiling and/or relative to the rods 800, 802 and/or relative to the structural element 1. The cover is preferably also rotatable by 360°.

The arrangement shown in FIG. 31 is not restricted to the fixing between the floor and the ceiling, but rather covers the arrangement between two walls of any desired form such as the walls of a building, furniture walls, etc. The rods 800, 802 can thus also extend horizontally.

The present invention is based in a preferred embodiment of the invention on the dependence of at least one central element (e.g. hinge) and on a closed force flow which always ends geometrically at the outer end at 45°. Shear forces and compressive forces are thus ideally compensated and a defined frame can be ensured with high precision. The width and depth matching thus takes place via an angular adjustment in the hinge and a matching of the limbs standing perpendicular via freeform elements which are connected over the neutral fiber by means of an L piece or T piece. The height, width and depth of the grate structure or of the structural element thus results from different limb lengths, angular changes in the joint and at the adapters of the perpendicular struts.

Heavy units such as an oven or a dishwasher can also be positioned between two grate structures and can be lined or fixed via the adapters of the two grate structures. It is generally alternatively or additionally possible, however, also to accommodate such units in the space spanned by the structural element.

The following demands are met in a preferred embodiment of the invention by the structural element in accordance with the invention.

Access direction in all four directions;
First time integration at the center of rotationally symmetrical bodies (e.g. trash) has become possible:
Thin and thick fronts due to adapters between at least two grate structures or structural elements;
No separate pedestal;
Hidden wheels since inwardly installable;
Lining (cheek) can be used, but does not have to be used;
Hinge so-to-say surface-flush since adapter recessed; and
Packaging as a flat-pack.

As stated above, the structural element in accordance with the invention can also be used for tables, benches and chairs.

The structural element has an esthetic appearance, i.e. preferably a unified appearance.

It can be used continuously for kitchen planning both as a "stand-alone" product and as an integrated system.

It is preferred that the perpendicular limbs or struts always run out at 45° (i.e. in every dimension variant—width/depth). Space is required here for the additional adapters for receiving fronts, runners, etc.

As stated above, the structural element can also be used for functional elements which combine different functions such as Fire or stove plus extraction plus light;
Water plus light;
Preparation plus extraction plus light; and
Storage plus extraction.

Any desired combinations of functional elements are conceivable which can be arranged on and/or in a structural element or between a plurality of structural elements.

Figure 32:
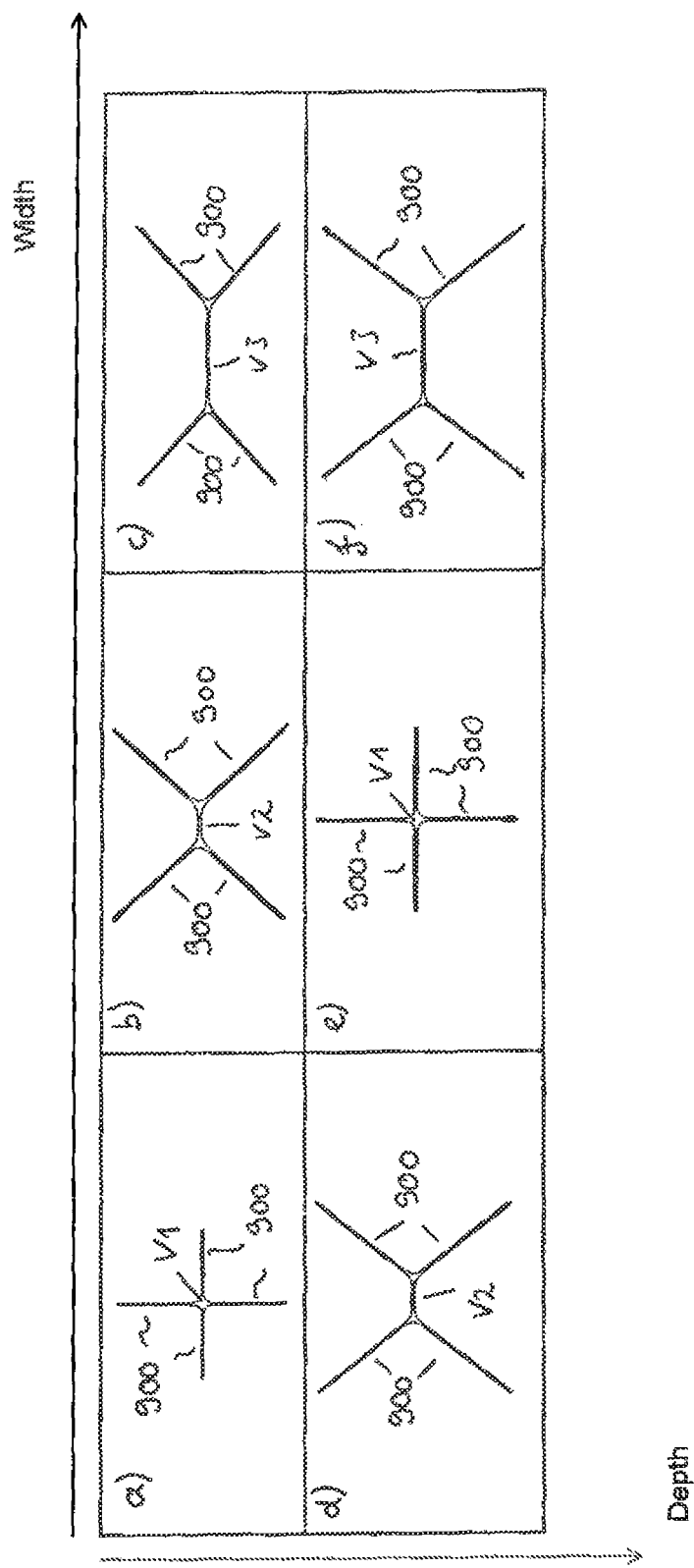
FIG. 32: a view of different variants of structural elements in the plan view.

FIG. 32 shows a view of different variants of structural elements in the plan view with connection parts V1 to V3 and frame elements 900. As can be seen from FIG. 32, a plurality of structural elements which differ from one another in depth and width can be provided by the variation of the connection parts and the frame elements. A vertical adjustment is also possible by the use of corresponding frame elements.

The frame elements are all marked by reference numeral 900 in FIG. 32, but partly differ in their dimensions.

Embodiments a) and e) show a compact X-shaped connection part V1, with the frame elements in accordance with a) being smaller than in accordance with e).

Embodiments b) and d) show the same connection parts V2 having Y-shaped ends and having different frame elements. In embodiments c) and f), the connection parts V3 having Y-shaped ends are different in that the angle at which the frame elements stand with respect to one another is different. In addition, the frame elements have different lengths.

Figure 33A:
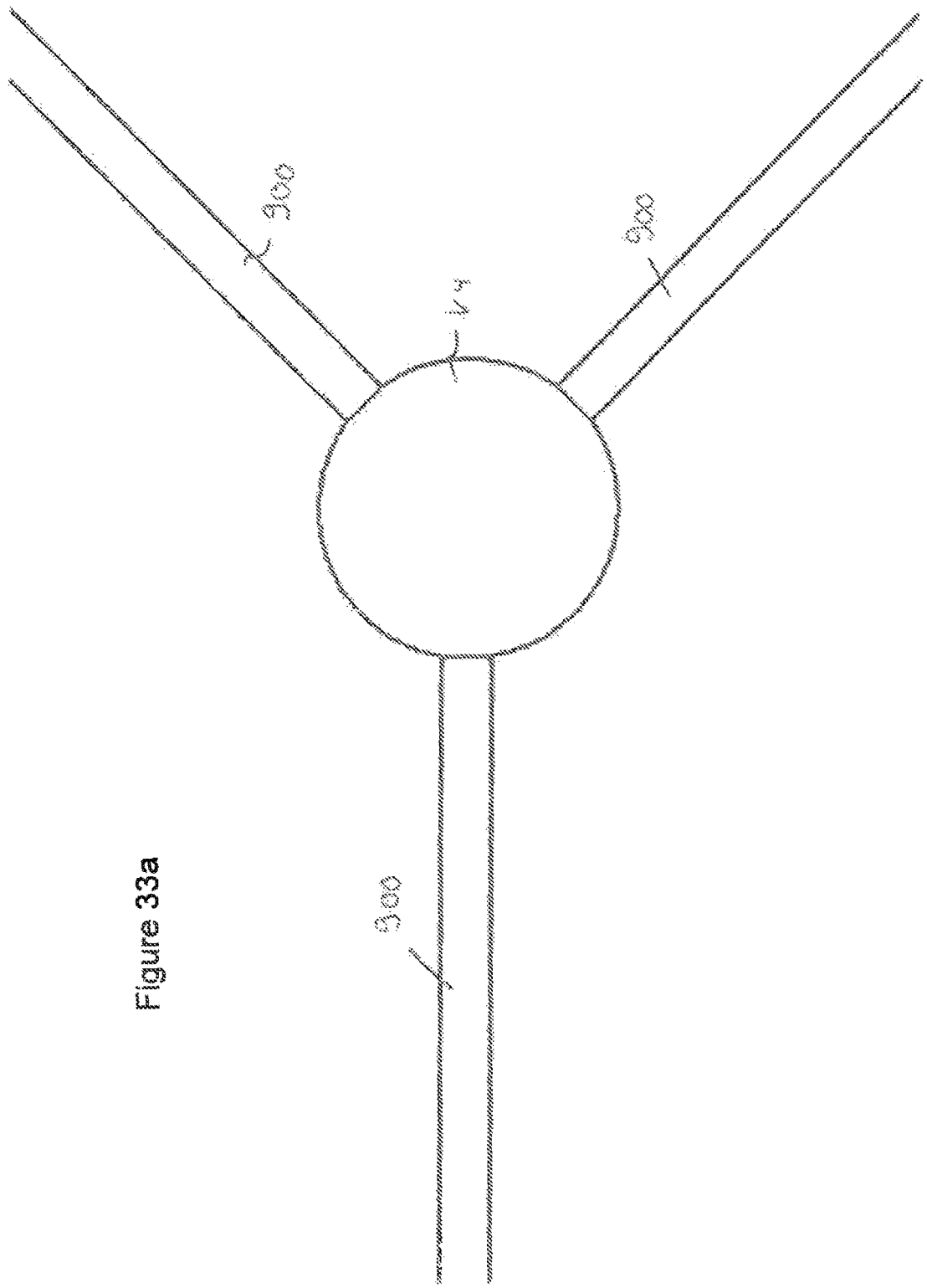
FIG. 33: different views of a connection part.
Figure 33B:
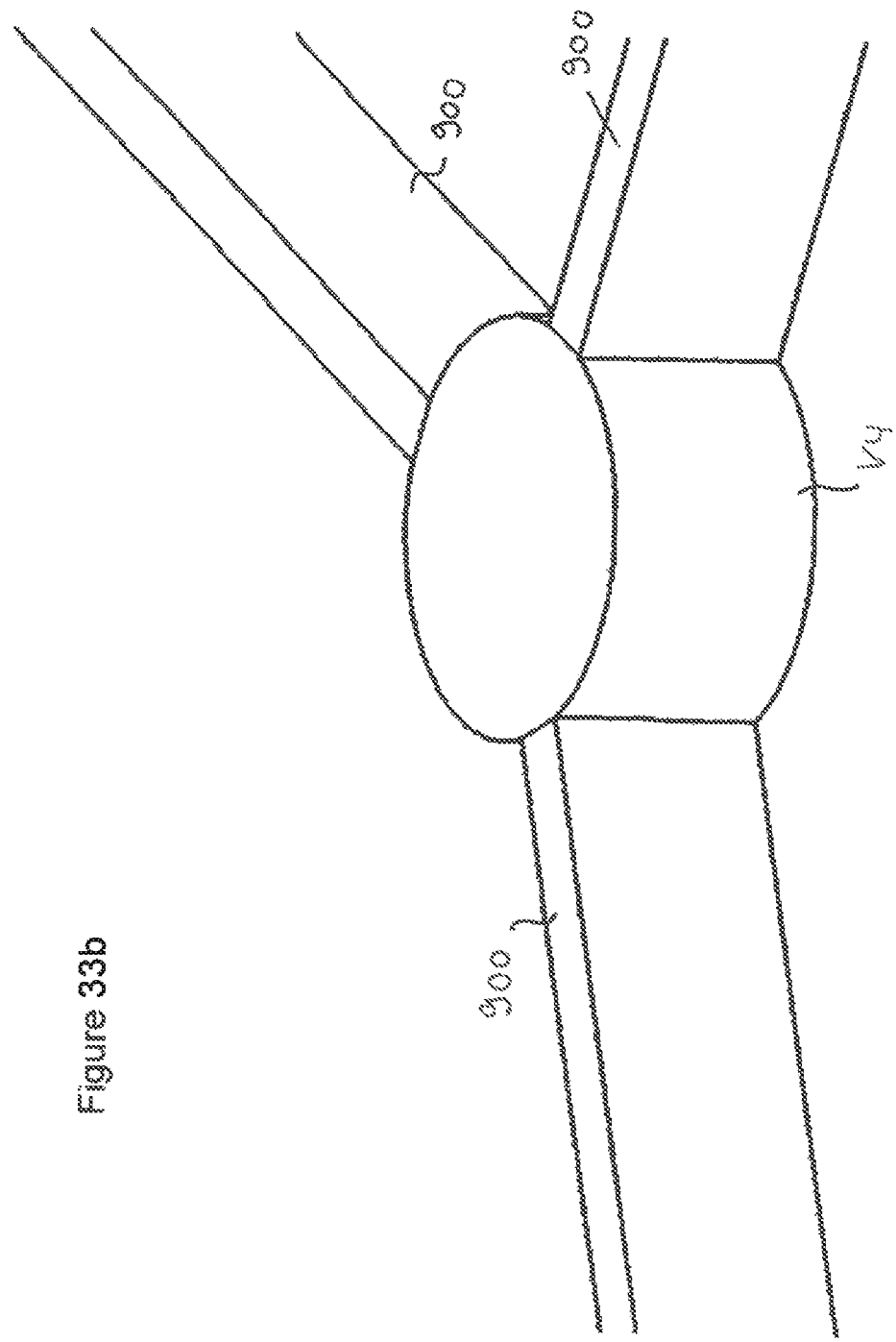

FIGS. 33a and 33b show different views of a connection part V4 which is designed as a compact disk-shaped body. Three frame elements 900 are arranged at the connection part. The frame elements 900 are arranged as vertical runners whose height corresponds to that of the connection part V4.

Figure 34:
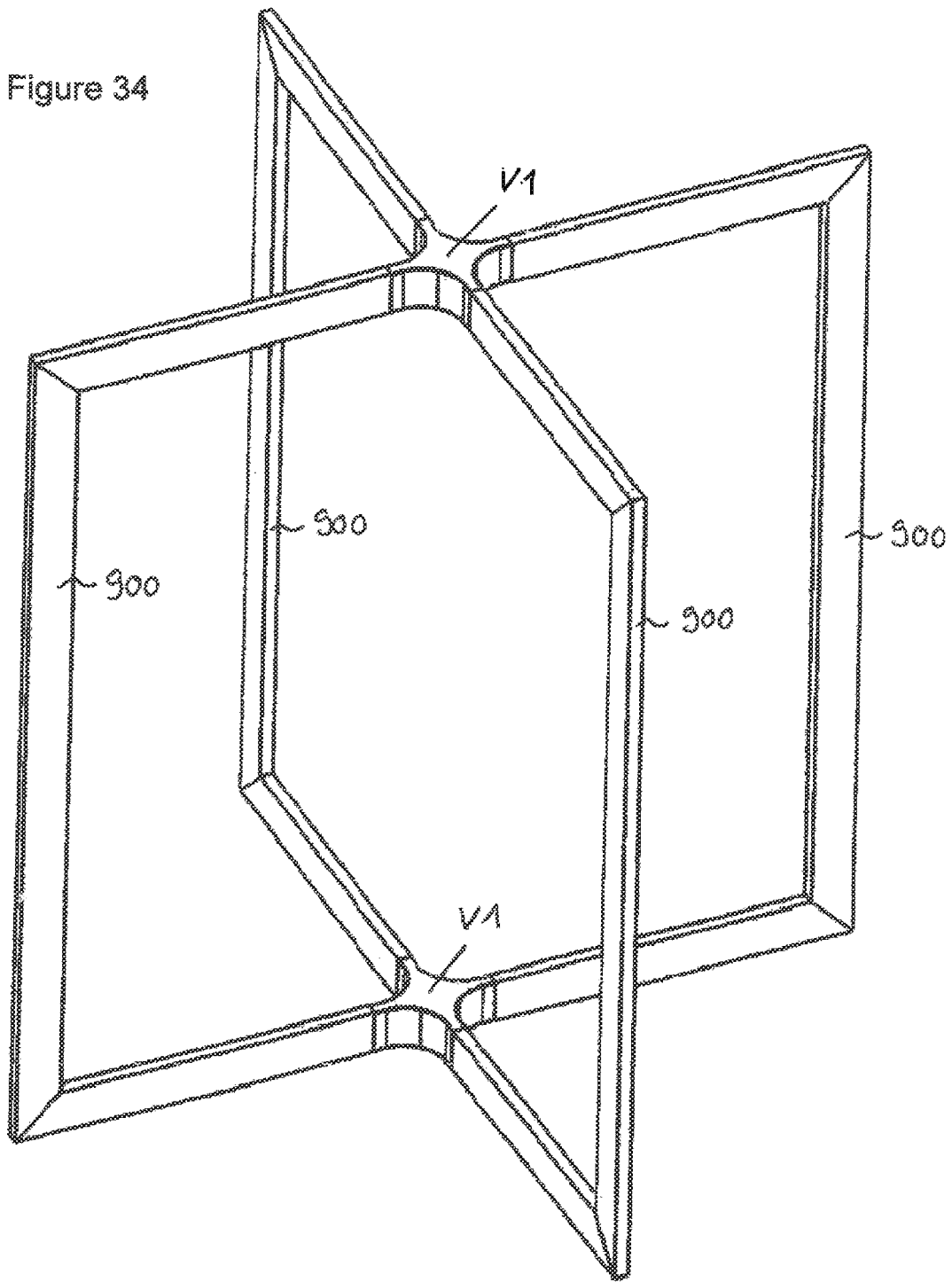
FIG. 34: a perspective view of a structural element with a compact X-shaped connection part.

FIG. 34 shows a perspective view of a structural element having compact X-shaped connection parts V1 which are arranged above one another and which are connected to one another by four frame elements 900. Each of the frame elements has two horizontal limbs and a vertical limb arranged therebetween, with the ends of the horizontal limbs being fixed at the two connection parts V1. The other ends are connected to the vertical limbs.

An arrangement of two connection parts disposed above one another and frame elements in accordance with FIG. 34 is preferably also present for the embodiments in accordance with FIGS. 32 and 33.

As can be seen from FIG. 34, the frame elements span a space which is bound by the limbs of the frame elements. One or more functional elements such as storage shelves, boxes, drawers, etc. can be arranged in this space.

The two connection parts V1 are disposed exactly above one another; the same applies accordingly to the horizontal limbs of the frame elements 900.

The horizontal limbs of the frame elements 900 each form a plane together with the connection part. Two such planes are present in the embodiment in accordance with FIG. 34.

The invention is, however, not restricted thereto, but can rather also comprise more than two planes. More than two connection parts can accordingly also be present.

The above statements on FIG. 34 represent preferred embodiments and apply in a preferred aspect not only to the specific embodiment in accordance with FIG. 34, but also generally to the present invention.

Figure 35:
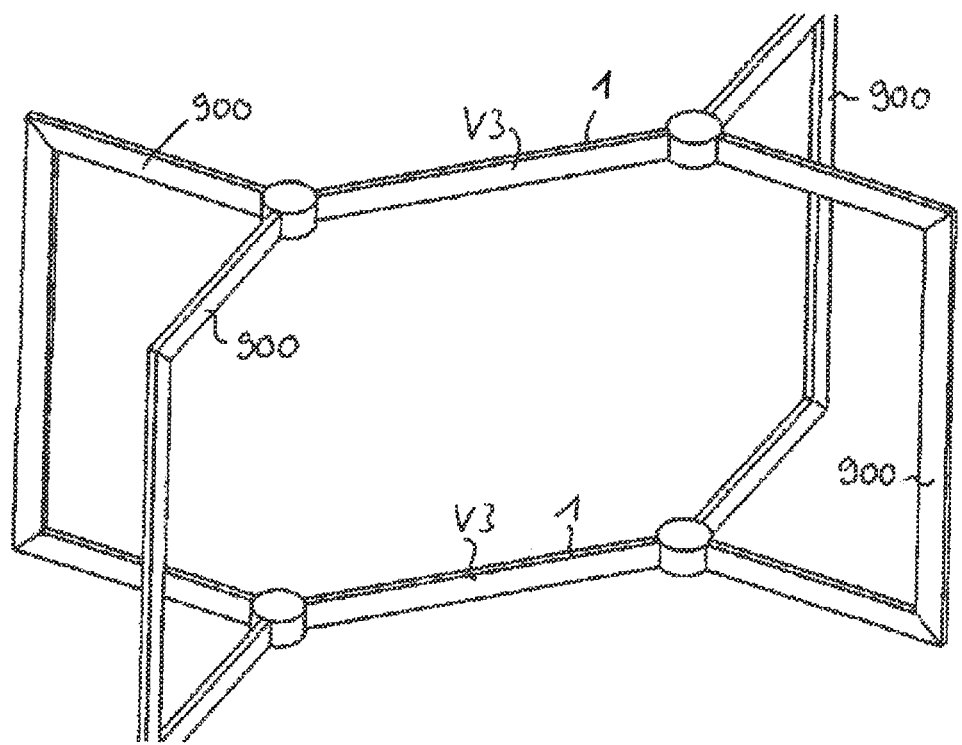
FIG. 35, 36: a perspective view and a plan view of a structural element with an elongate connection part with O-shaped ends.
Figure 36:
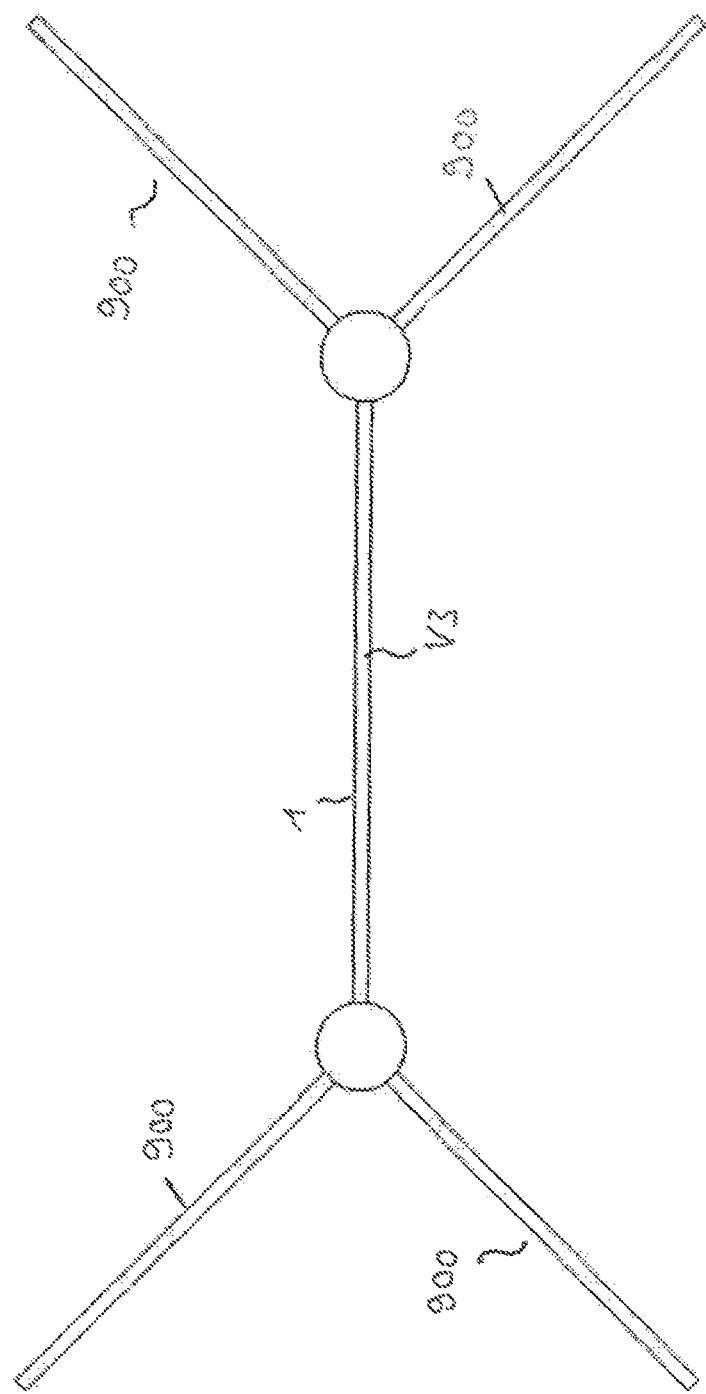

FIGS. 35 and 36 show a perspective view and a plan view of a structural element having an elongate connection part V3 having O-shaped ends at which two respective frame elements 900 are located. The O-shaped ends are designed as can be seen from FIG. 33. The runner 1 of the connection element which connects the O-shaped ends to one another preferably corresponds in its height and width to the runners forming the frame elements.

The embodiment in accordance with FIG. 33 can also be a part of the embodiment in accordance with FIGS. 35 and 36, with in this case only two frame elements 900 and the runner 1 of the connection element being connected to the O-shaped end.

Figure 37:
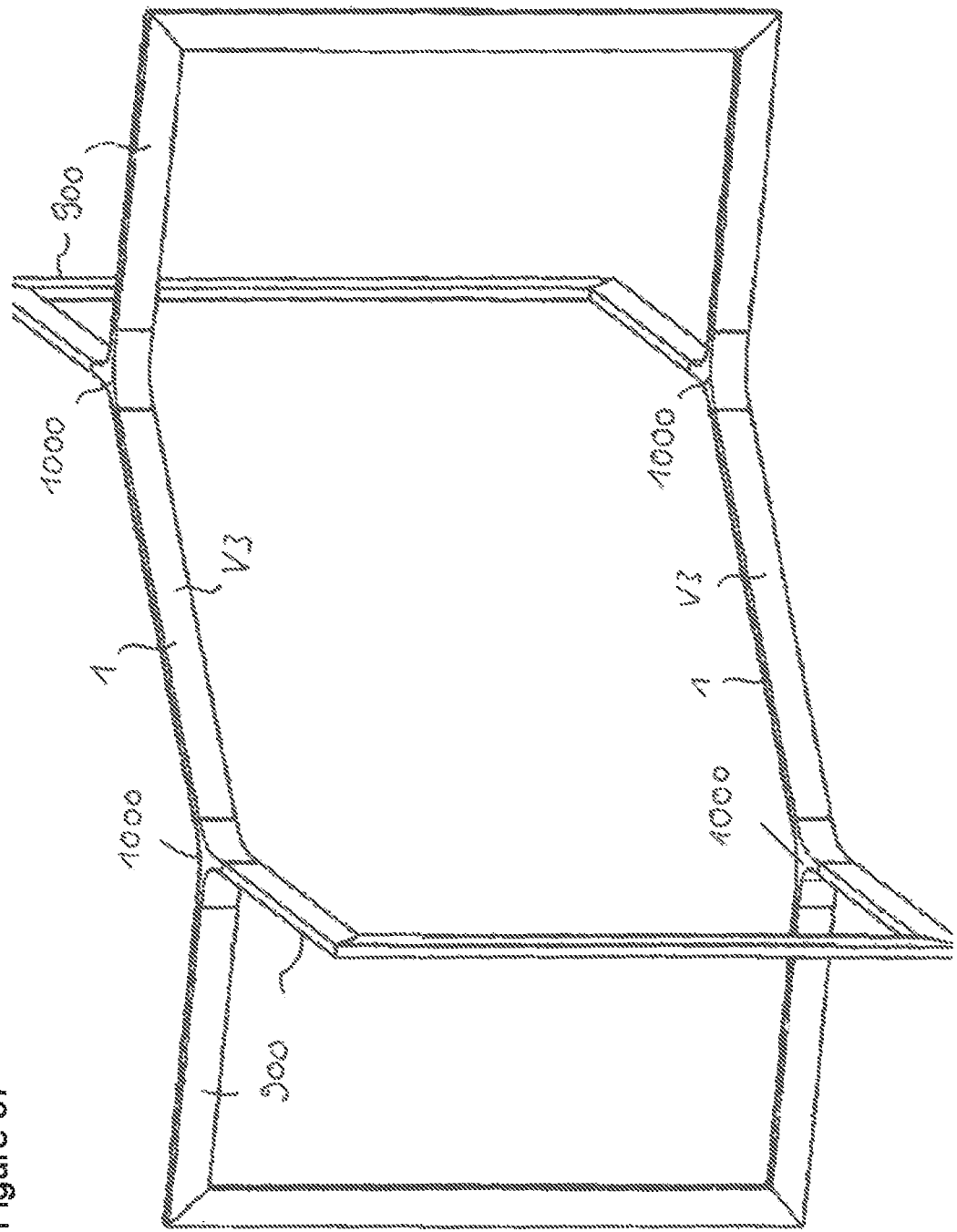
FIGS. 37-39: a perspective view and plan views of a structural element with an elongate connection part with Y-shaped ends.
Figure 38:
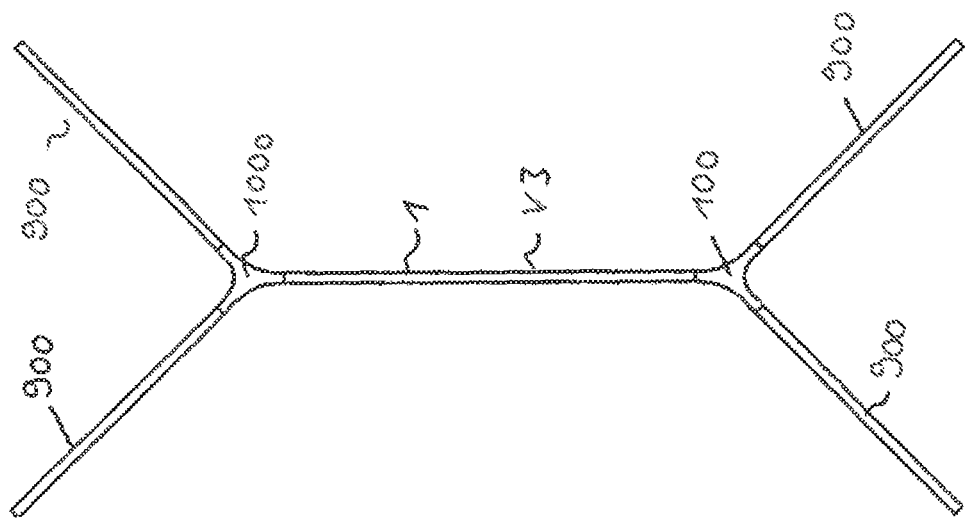
Figure 39:
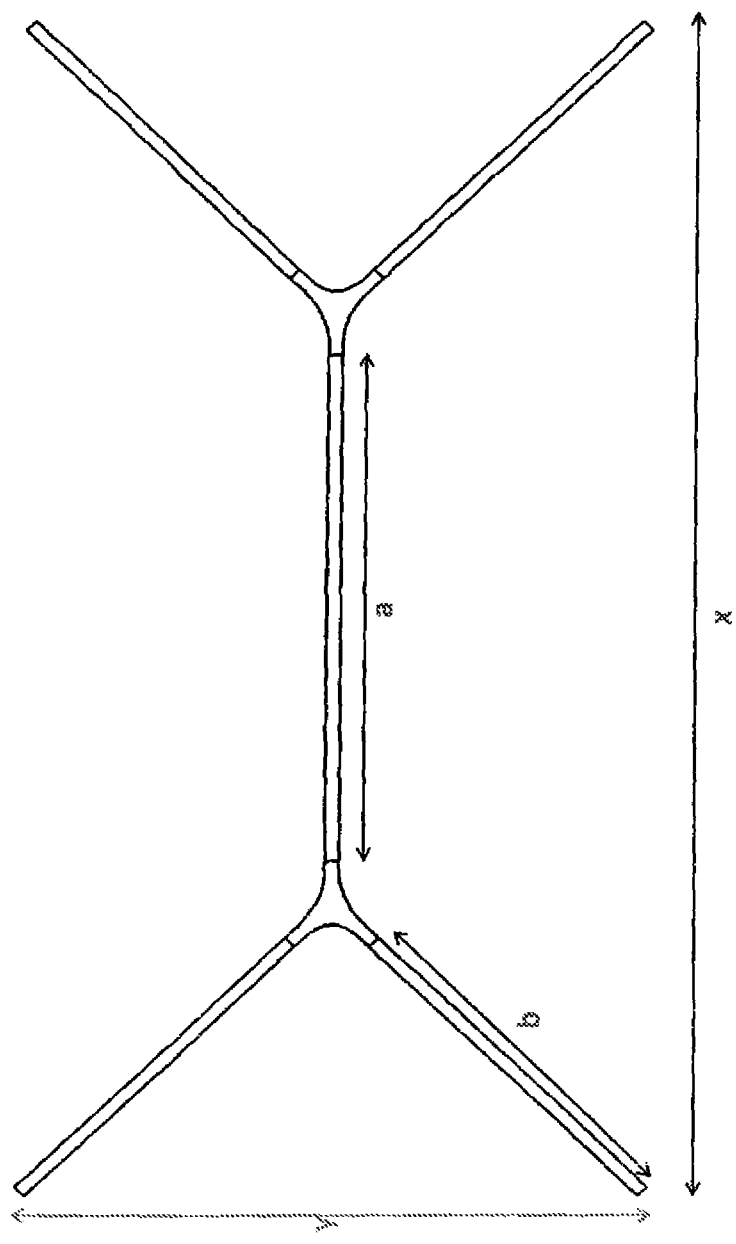

FIGS. 37-39 show a perspective view and plan views of a structural element with an elongate connection part with Y-shaped ends. Reference is made for explanation to FIGS. 35 and 36 whose only difference from the embodiment in accordance with FIGS. 37-39 is that the O-shaped ends are replaced with Y-shaped ends 1000.

FIG. 39 corresponds to FIG. 38 and illustrates that different dimensions a, b, x and y as well as also different angles between the frame elements can be obtained depending on the selection of the connection part and of the frame element.

The statements on FIGS. 35 to 39 have the shape in plan view of two Y elements which are arranged in mirrored form with respect to one another and which contact one another in the plane of the mirror.

Figure 40:
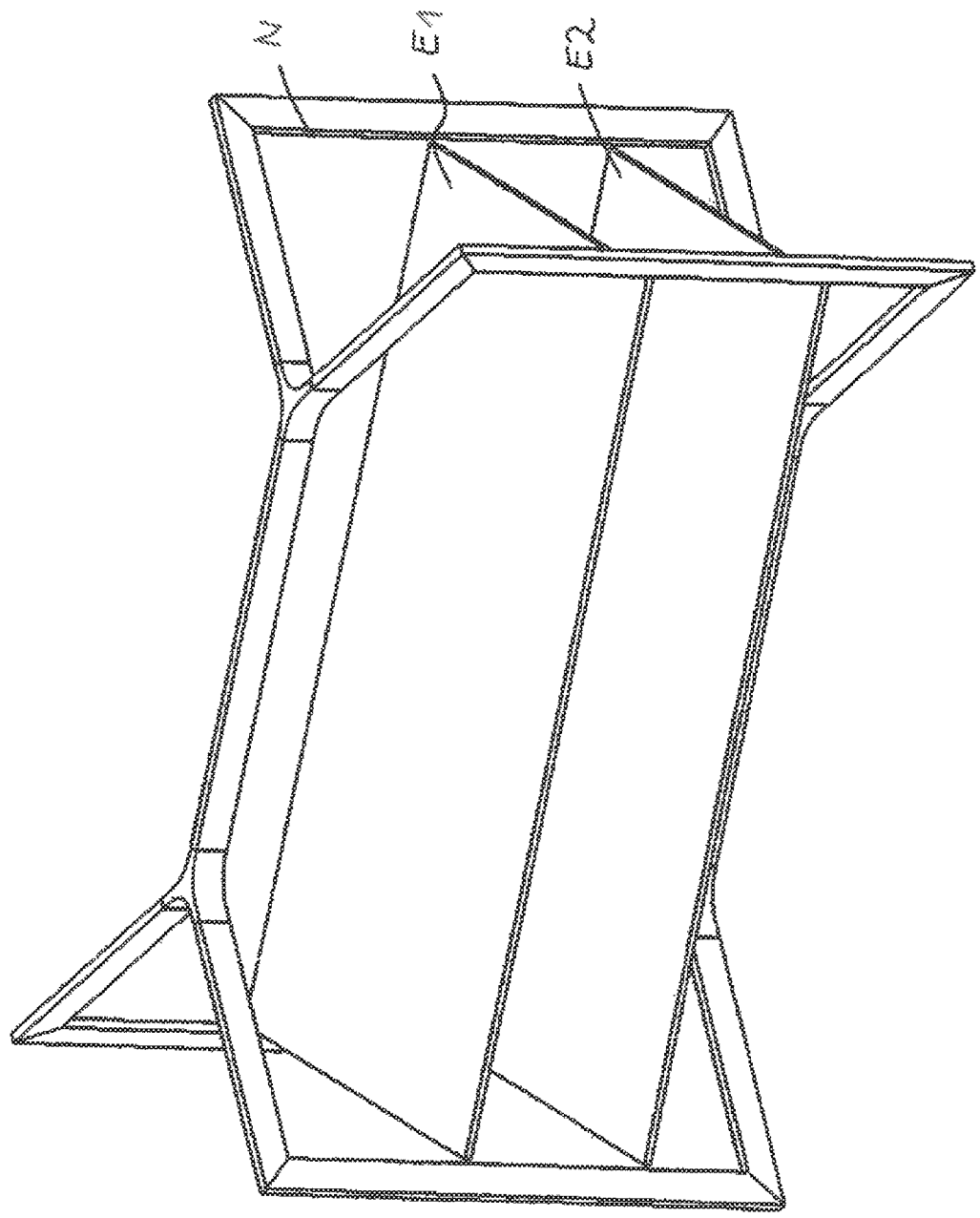
FIG. 40: a perspective view of a structural element in accordance with FIGS. 38, 39 with insertable shelves.

FIG. 40 shows a perspective view of a structural element in accordance with FIG. 38, 39 with insertable shelves E1 and E2 which are arranged above one another. A respective groove N in which a projection of the insertable shelves E1 and E2 is received is located in the inner sides, i.e. in the inwardly disposed narrow sides of the parts of the frame elements 900 extending in a perpendicular manner. The insertable shelves are fixed relative to the frame elements in this manner.

Figure 41:
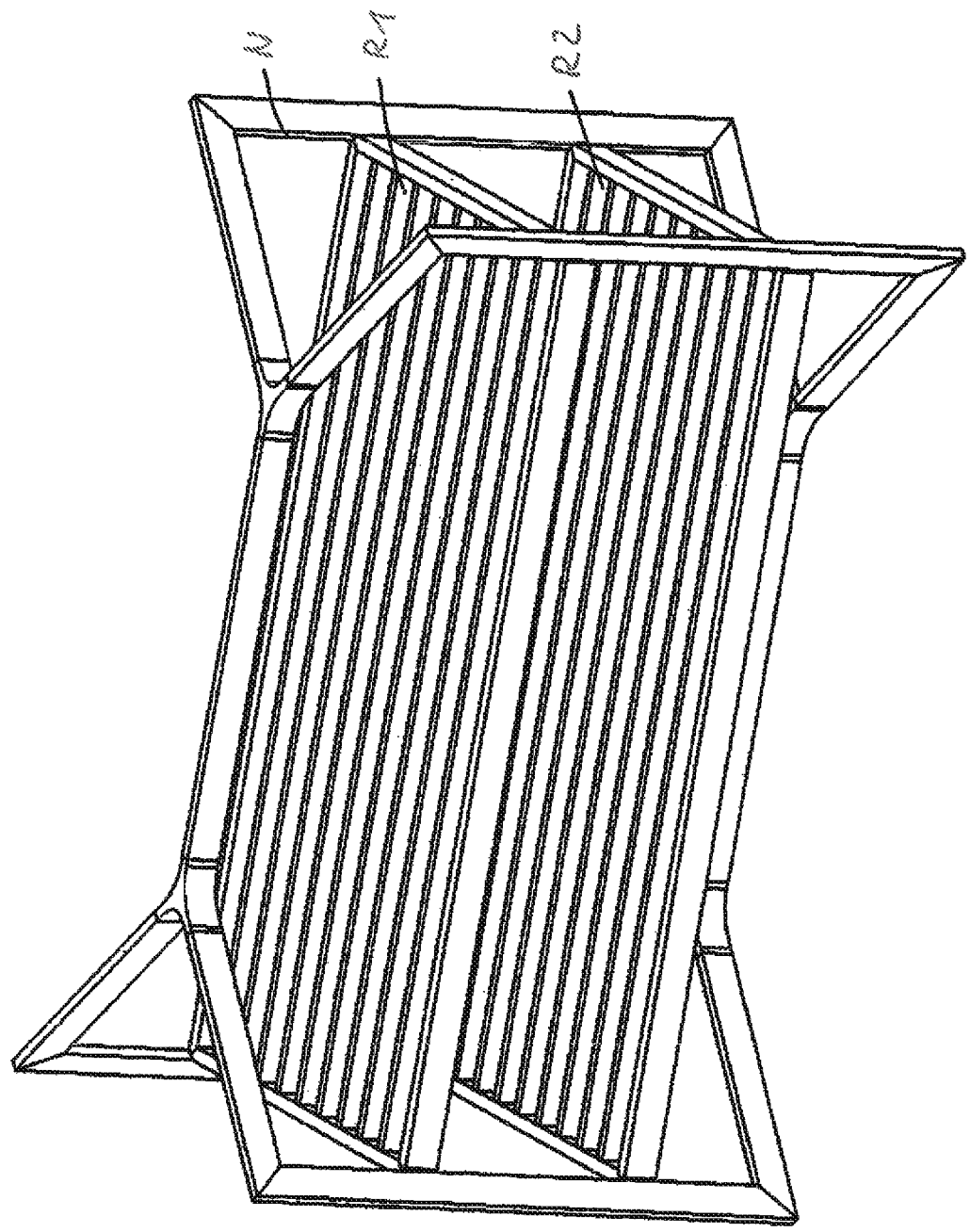
FIG. 41: a perspective view of a structural element in accordance with FIGS. 38, 39 with insertable grates.

FIG. 41 shows a corresponding view with insertable grates R1 and R2.

Depending on the design of the groove or of the projection located therein, the insertable shelves E1 and E2 are vertically adjustable, i.e. they can be arranged at different positions of the grooves.

Figure 42A:
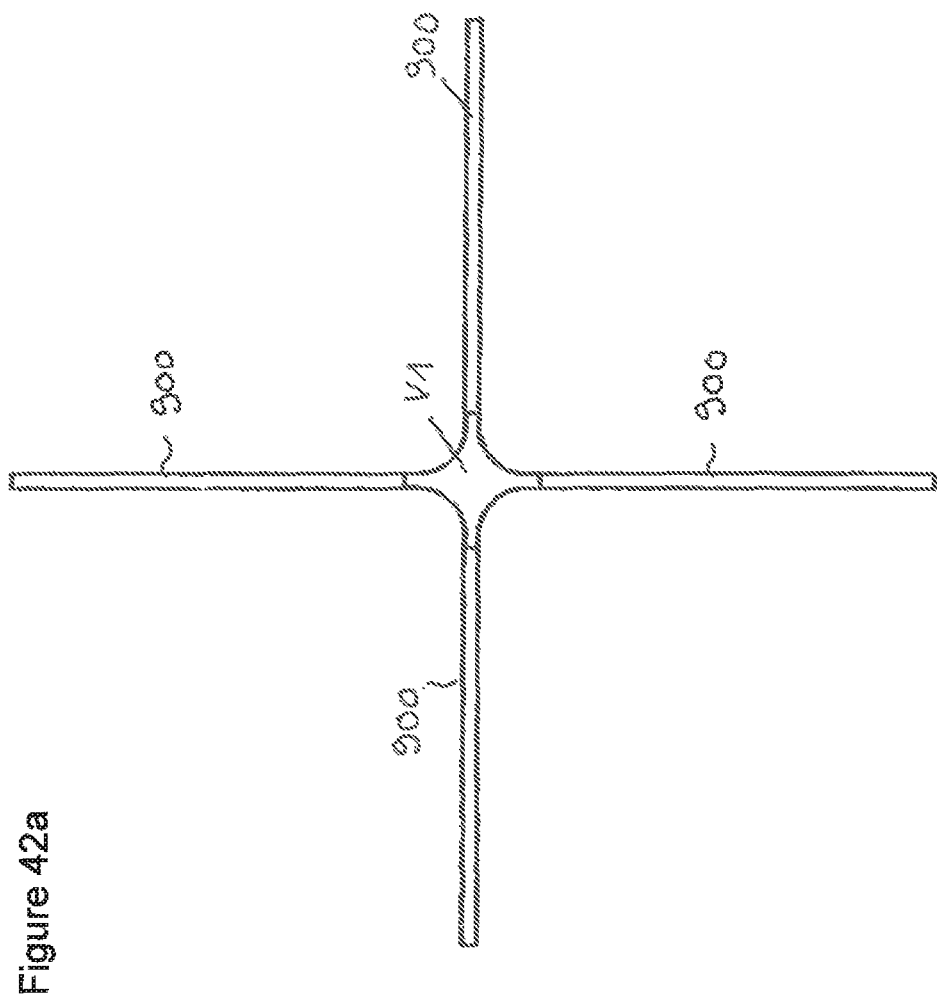
FIG. 42, 43: a plan view and a perspective view of an X-shaped connection part with frame elements.
Figure 42B:
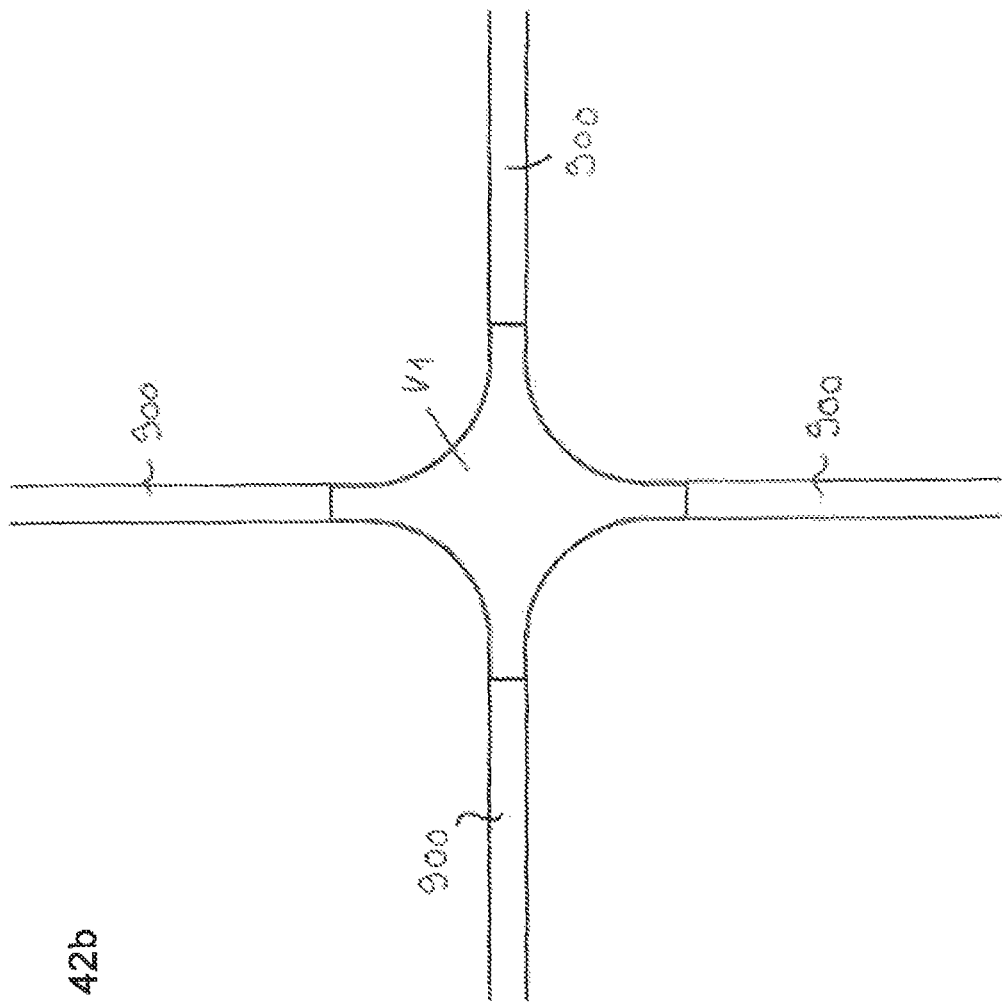
Figure 43:
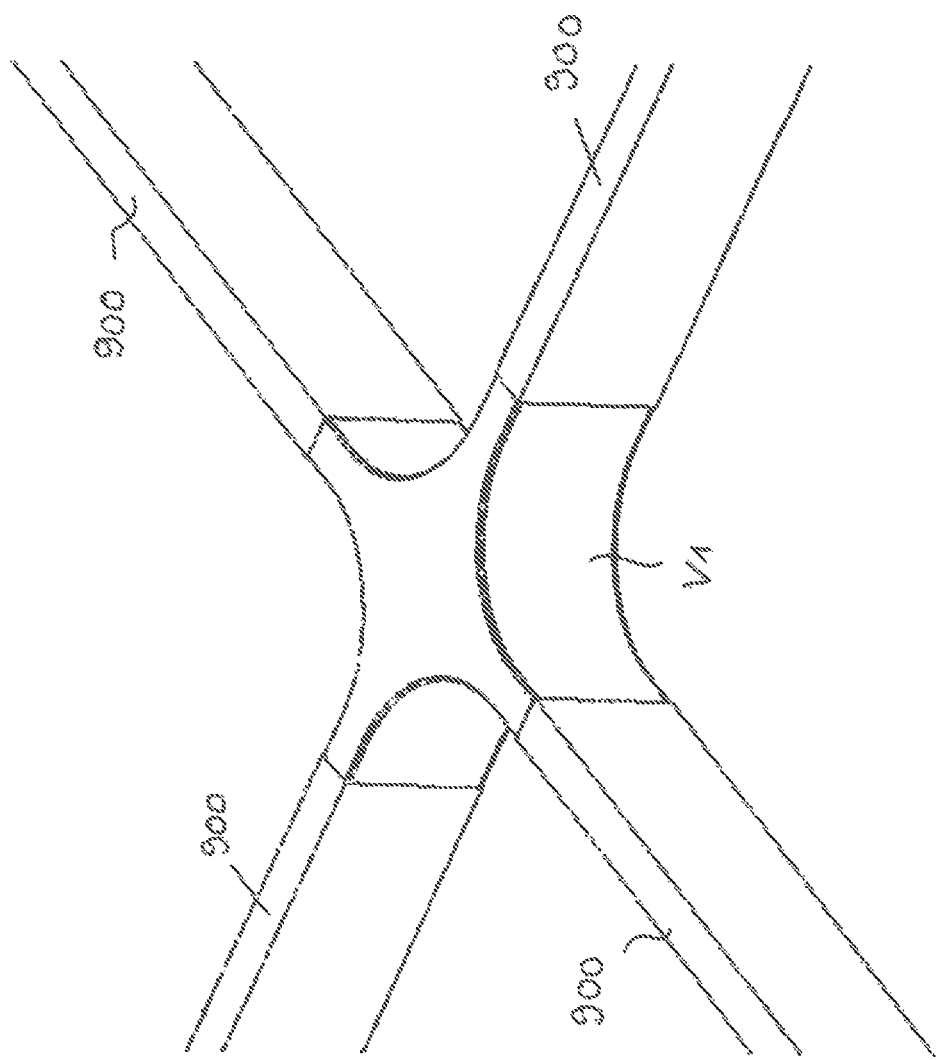
Figure 44:
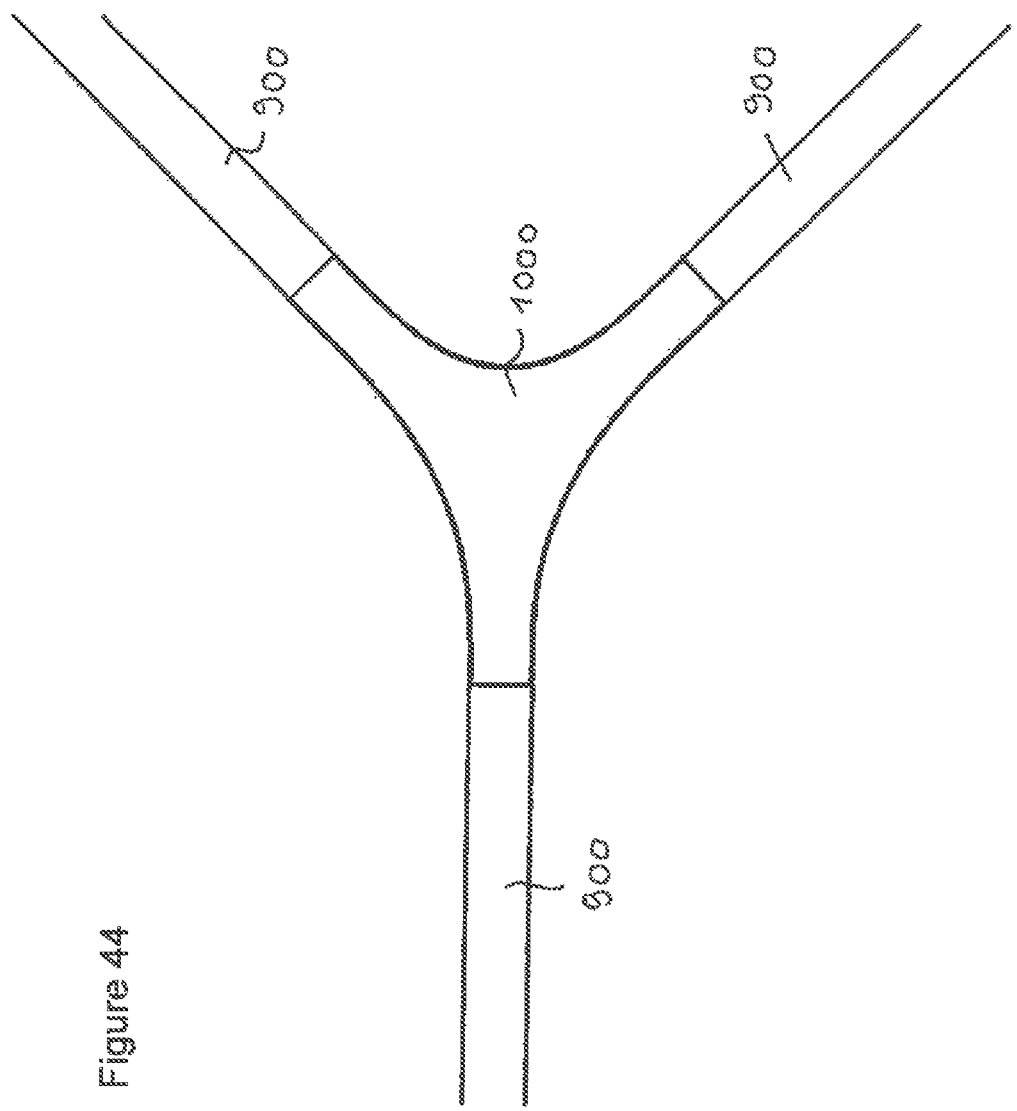
FIG. 44, 45: a plan view and a perspective view of a Y-shaped connection part with frame elements.

FIGS. 42 and 43 show a plan view and a perspective view of an X-shaped connection part V1 having frame elements fixed thereto. This structure is found, for example, in the structural element in accordance with FIG. 34.

The part V1 has four ends at which the frame element 900 are set; the regions between the ends are concave, as can be seen from FIG. 42. A single-part design of the connection part V1 and the frame elements is also conceivable and covered by the invention.

It results from FIG. 43 that the level of the runners which form the frame element 900 corresponds to the level of the connection part V1.

Figure 45:
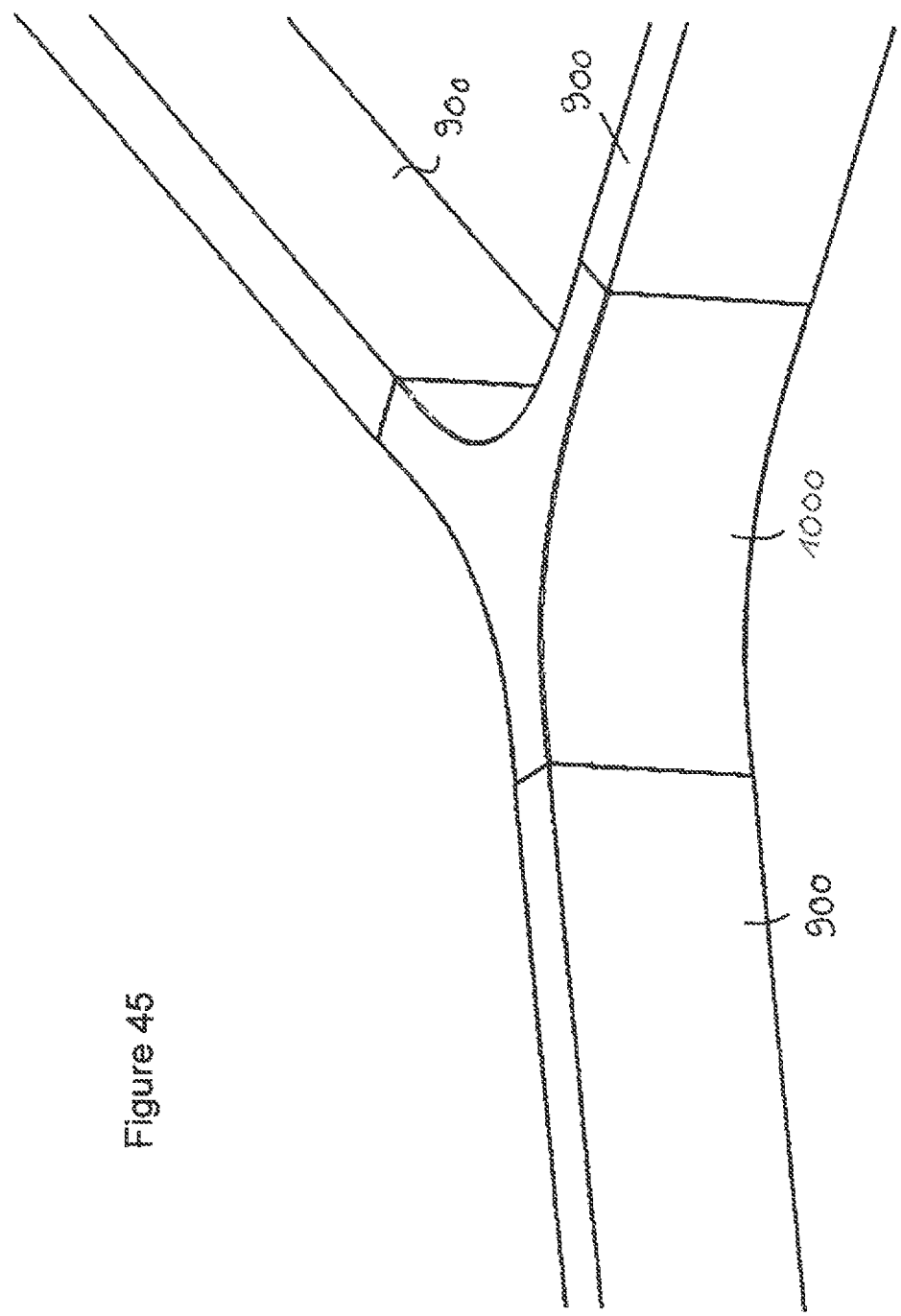

FIGS. 41 and 45 show a plan view and a perspective view of a Y-shaped connection part 1000 having frame elements 900 fixed thereto. This structure is found, for example, in the structural element in accordance with FIGS. 37 to 41, with one of the frame elements being replaced with a runner 1 of the connection part in this case.

The connection part 1000 has three ends of which two include a smaller angle with one another than two respective other ends. However, the case is also generally covered by the invention that the angles between all the ends are identical.

In the embodiments in accordance with FIGS. 32 to 45, the frame elements are connected to the connection parts such that no adjustability is present relative to one another, i.e. the frame elements and the connection parts cannot be fixed in different positions relative to one another.

In general, the connection element in accordance with FIGS. 32 to 45 can, however, also be configured as a hinge in the sense of the present invention such that a variable arrangement of the frame elements relative to the connection parts is made possible. The hinge can, for example, be designed in accordance with one of the FIGS. 1 to 31.

The embodiments in accordance with FIGS. 1 to 31 have a hinge. However, any of these embodiments is also covered by the invention in which the hinge is replaced with a connection part in which the frame elements are not fixable in different positions relative to the connection part, but rather at specific positions.

In general, the frame elements and the connection part(s) can also be designed in one piece or can also comprise a plurality of parts which are connected, e.g. screwed, to one another.

The height and width of the runners, rods or the like forming the frame elements preferably correspond to the height and width of the points of the connection parts to which the frame elements are fastened.

The structural element preferably has two connection elements which are substantially or exactly arranged above one another and which are each connected by frame elements. The frame elements preferably have the shape of a lying U whose limb ends are connected to the connection parts.

The invention claimed is:

1. A structural furniture element, having at least one frame which comprises four frame elements (101, 102, 103), wherein
    each said frame element (101, 102, 103) has at least one limb (V) extending from top to bottom
    one or more struts (L1, L2) extend from the limb (V) of a first frame element (101, 102, 103) to a limb (V) of a second frame element (101 102, 103), with each said strut (L1, L2) having an upper side inclined relative to a horizontal,
    additionally comprising a hinge (31), with the frame elements (101, 102, 103) each being fixedly connected to the hinge (31) and positionable at different angles relative to one another by the hinge (31),
    the structural furniture element has opposite first and second sides, and
    at least one or more first struts (L1, L2) is located on the first side and one or more second, struts (L1, L2) is located on the second side, with the oppositely-positioned first and second struts (L1, L2) being positioned such that the upper sides thereof are inclined downwardly to the horizontal and toward the inner side of the structural furniture element.

2. A structural furniture element, having
    at least two frame elements (10, 20),
    a hinge element (30) for interconnecting said at least two frame elements (10, 20), wherein
    said hinge element has a base body (32), a circumferential groove (33) provided around said base body (32), a plurality of recesses (35) distributed circumferentially around said base body (32) and positioned for receiving ends of said at least two frame elements (10, 20),
    said circumferential groove (33) comprising flared regions (33c) at discrete locations around the circumference, and additionally comprising
    at least two connection elements (40) for connecting a respective frame element (10, 20) with said hinge (30),
    wherein said flared regions (33c) are configured to receive ends of said respective connection elements (10, 20) which are then slidable along said circumferential groove (33) to a respective recess (35), such that said frame elements (10, 20) span a space (R) having a shape depending upon an angle (α, β, Y) between said frame elements (10, 20) when seated in said respective recesses (35).

3. A structural element in accordance with claim 2, wherein the frame elements are arranged non-movably relative to the hinge element.

4. A structural element in accordance with claim 2, wherein the structural furniture element is connected to two rods which are each connected to a wall, ceiling or floor, with the structural element being rotatably arranged.

5. A structural element in accordance with claim 2, wherein the connection part is designed in plan view as a round, angled, X-shaped or Y-shaped part or as an elongated part at whose ends a respective one or more round, angled, X-shaped or Y-shaped parts are arranged.

6. A modular system comprising structural elements in accordance with claim 2 as well as adapters for installing at the at least two frame elements, wherein the adapters are configured identically for all the structural elements.

7. A furniture system, having at least two structural elements in accordance with claim 2.

8. A system in accordance with claim 7, wherein the at least two structural elements are arranged directly next to one another or above one another, with there being a spacing between two structural elements, with one or more functional elements being located between or on the structural elements, and with the functional elements being at least one of a work surface, sink, shelf, drawer, electrical appliance or storage space.

9. A system in accordance with claim 7, wherein the functional element is at least one shelf, with the at least two structural elements each having at least one axle or shaft, and with the shelf comprising at least one element which extends peripherally about the at least two axles/shafts of the at least two structural elements and at which one or more shelf elements are arranged.

10. A system in accordance with claim 9, wherein the axles/shafts extend in alignment with connection part(s) or hinge(s) of the frame elements.

11. A system in accordance with claim 9, wherein drive means are provided which are configured such that they effect a movement of the peripheral element about the axles/shafts.

12. A table having at least one structural element in accordance with claim 2, wherein the table has at least one table top which lies on the structural element(s).

13. A chair or stool having at least one structural element in accordance with claim 2, wherein the chair or stool has at least one seating element which forms the seating surface and which lies on the structural element.

14. A chair or stool in accordance with claim 13, wherein at least one backrest and/or at least one element rotatable relative to the structural element is provided, and the rotatable element is arranged such that the structural element is rotatable relative to its surface on which it stands and/or the seating element and/or the backrest is/are rotatable relative to the structural element.

15. A structural element in accordance with claim 2, wherein said groove (33) has a T-shape cross-section.

16. A structural element in accordance with claim 2, wherein said recesses (35) are each rectangular in shape.

17. A structural element in accordance with claim 2, wherein said connection elements (40) each comprise
 a first section (41) at one end thereof and configured to be received in said groove (33),
 a second section (42) at an opposite end thereof and configured to connect to a respective frame element (10, 20),
 an intermediate section (41) of smaller diameter than said first and section sections (41, 42), and
 said second section (42) comprising a chamfered region (44) having surfaces extending obliquely to a longitudinal axis of said connection element (40).

18. A structural element in accordance with claim 17, wherein said second section comprises two said chamfered regions (44) separated from one another, with each said chamfered region comprising two obliquely-extending surfaces in opposite directions from one another.

* * * * *